United States Patent
Tsutsui et al.

(10) Patent No.: US 6,270,444 B1
(45) Date of Patent: Aug. 7, 2001

(54) SHIFT CONTROL APPARATUS FOR AUTOMATIC TRANSMISSION

(75) Inventors: Hiroshi Tsutsui; Kouichi Kojima; Yutaka Teraoka, all of Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/466,872

(22) Filed: Dec. 20, 1999

(30) Foreign Application Priority Data

Nov. 1, 1999 (JP) .................................................. 11-311721

(51) Int. Cl.$^7$ .................................................. F16H 61/08
(52) U.S. Cl. .......................... 477/143; 477/155; 477/158; 475/127
(58) Field of Search .................................. 477/143, 144, 477/158, 155; 475/116, 127

(56) References Cited

U.S. PATENT DOCUMENTS

| | | | |
|---|---|---|---|
| 4,718,310 | * | 1/1988 | Shindo et al. ........................ 477/138 |
| 4,727,774 | * | 3/1988 | Sumiya et al. ........................ 477/143 |
| 5,106,352 | | 4/1992 | Lepelletier . |
| 5,315,898 | * | 5/1994 | Koyama et al. .................. 475/116 X |
| 5,505,673 | * | 4/1996 | Tsukamoto et al. .............. 477/143 X |
| 5,682,792 | * | 11/1997 | Liesener et al. .................. 477/155 X |
| 5,842,950 | * | 12/1998 | Tsutsui et al. ........................ 477/143 |

FOREIGN PATENT DOCUMENTS

| | | | |
|---|---|---|---|
| 5180323 | * | 7/1993 | (JP) ...................................... 477/143 |
| 6185604 | * | 7/1994 | (JP) ...................................... 477/143 |

* cited by examiner

Primary Examiner—Charles A Marmor
Assistant Examiner—Ha Ho
(74) Attorney, Agent, or Firm—Oliff & Berridge, PLC

(57) ABSTRACT

Quick shifting is achieved while preventing a shift shock when shifting is caused by grip change of four engagement elements. The automatic transmission requires activation of the four engagement elements when shifting from a first shifting position (sixth speed) to a second shifting position (third speed) is performed. This shifting control apparatus includes shift control means for starting disengagement of a second engagement element after starting disengagement of a first engagement element; completing engagement of a fourth engagement element after completing engagement of a third engagement element; and starting disengagement of the second engagement element before completing engagement of the third engagement element.

28 Claims, 17 Drawing Sheets

|     | C-1 | C-2 | C-3 | B-1 | B-2 | B-3 | F-1 | F-2 |
|-----|-----|-----|-----|-----|-----|-----|-----|-----|
| P   |     |     |     |     |     |     |     |     |
| R   |     |     | ○   |     |     | ○   |     |     |
| N   |     |     |     |     |     |     |     |     |
| 1st | ○   |     |     |     |     | △   |     | ○   |
| 2nd | ○   |     |     | △   | ○   |     | ○   |     |
| 3rd | ○   |     | ○   |     | ●   |     |     |     |
| 4th | ○   | ○   |     |     | ●   |     |     |     |
| 5th |     | ○   | ○   |     | ●   |     |     |     |
| 6th |     | ○   |     | ○   | ●   |     |     |     |

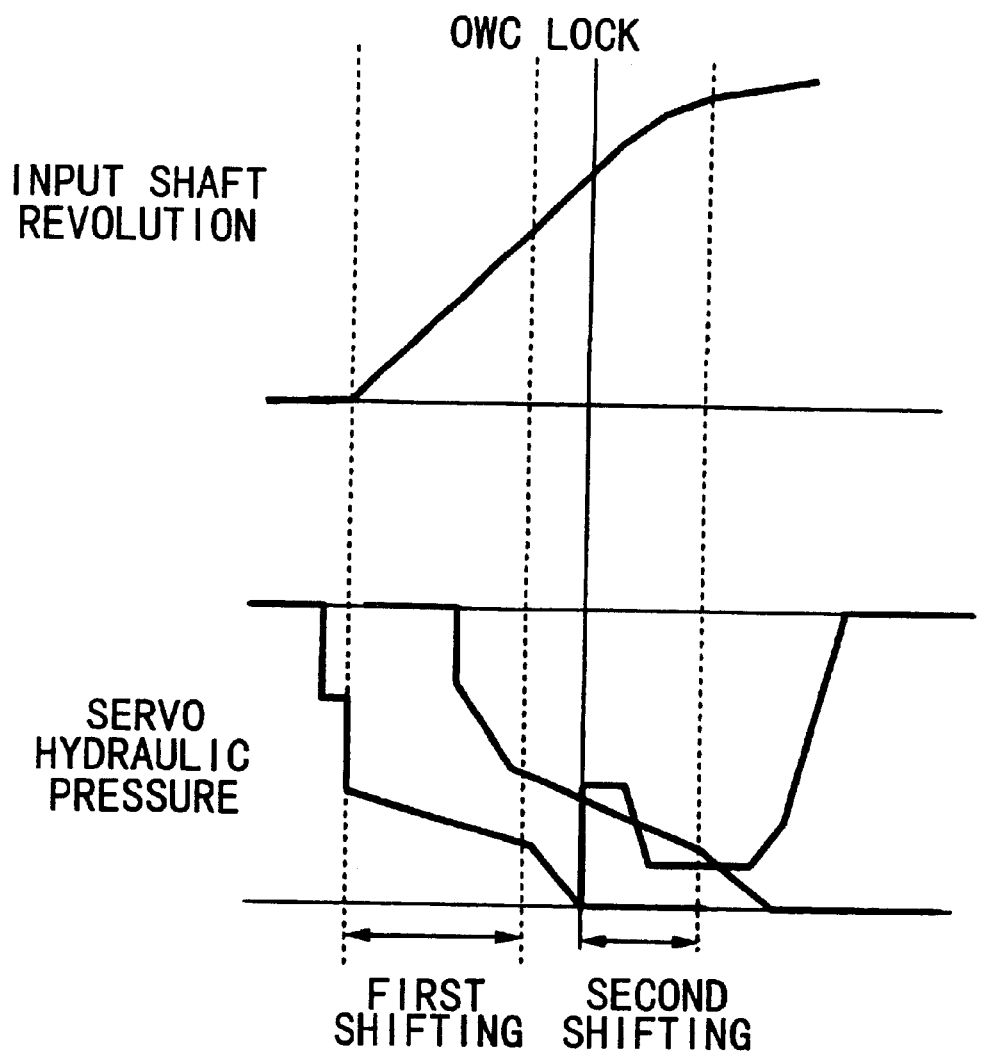

SHIFT CONTROL APPARATUS FOR AUTOMATIC TRANSMISSION

BACKGROUND OF THE INVENTION

1. Field of Invention

The invention relates to a shift control apparatus for an automatic transmission. In particular, the invention relates to a technique for smoothly performing a shift requiring disengagement and engagement of two different engagement elements between shift stages (simultaneous grip change of four elements).

2. Description of Related Art

In an automatic transmission, it has been well known that a power transmission route via a shift element composed of planetary gears is switched by engaging and disengaging friction engagement elements, thereby achieving a plurality of shift stages by changing a gear ratio. Engagement and disengagement of the engagement elements during shifting must be performed under a hydraulic control that is as simple as possible while reducing shock resulting from shifting. Thus, in general, operation of engagement elements for up-shift and down-shift basically includes additional engagement of another engagement element or disengagement of at least one engagement element being engaged. If the operation cannot be performed because of the gear train construction, one engagement element that has been already engaged is disengaged so as to engage another engagement element, that is, a so called grip change operation of engagement elements is performed.

Recently, automatic transmissions have been increasingly employing a multi-stage shifting mechanism so as to improve drivability and reduce the fuel cost by decreasing energy consumption. Such multi-stage shifting has been generally achieved by adding an acceleration or deceleration stage using an overdrive or under-drive gear to a shift mechanism consisting of a multi-staged planetary gear set. As another aspect, there has been disclosed in U.S. Pat. No. 5,106,352 a technology for achieving multi-stages by employing an input to a Ravigneaux type planetary gear set as two systems of high/low to achieve multi-stages.

In the multi-stage gear train as described above, the shifting speed conforming to the running state of a vehicle can be selected from a wider range of choices, thus causing the requirement for a complicated grip change of four elements as well as a simple grip change of two elements. As an example requiring such a grip change of four elements, there is shown a so-called skip shift from a number of shift stages to a particular shift stage at one time. In any case, when such a multiple grip change of four elements is performed, how to control the sequence or timing of the engagement and disengagement of each engagement element becomes a key issue. The failure of this control, if any, may cause the problem of degrading smooth advancement of shift operations within the transmission mechanism. In addition, if shift continuity is lost, there are problems of stepwise shocks during shifting, worsening of shocks at the end of shifting or an unnecessary increase of a shifting time.

SUMMARY OF THE INVENTION

In order to solve the foregoing problems, it is an object of the invention to provide a shift control apparatus for automatic transmissions capable of preventing retardation of shifting while minimizing shock during shifting by smoothing the advancing shift that requires engagement and disengagement of four engagement elements.

Preferably, the automatic transmission has brakes, clutches and/or one-way-clutches as engaging elements.

In order to achieve the foregoing object, according to the invention, there is provided a shift control apparatus for an automatic transmission in which activation of four engagement elements is required for shifting from a first speed to a second speed, the first speed is achieved by engagement of first and second engagement elements, and the second speed is achieved by engagement of third and fourth engagement elements. The control apparatus includes shift control means in which disengagement of the second engagement element is started after the start of disengagement of the first engagement element; engagement of the fourth engagement element is completed after completing engagement of the third engagement element; and disengagement of the second engagement element is started before completing engagement of the third engagement element.

Specifically, the control means starts disengagement of the second engagement element just before completing engagement of the third engagement element.

More specifically, the second and third engagement elements are controlled by hydraulic pressures of respective hydraulic servos, and the shift control means starts engaging the second engagement element by lowering the hydraulic pressure of the hydraulic servo for the second engagement element after the start of engaging the third engagement element by increasing the hydraulic pressure of the hydraulic servo for the third engagement element, and further completes engaging the third engagement element by increasing the hydraulic pressure of the hydraulic servo for the third engagement element.

In the foregoing construction, the shift control means detects an advancing state of shifting from the first speed to the second speed, and controls each hydraulic pressure of the hydraulic servos for the second and third engagement elements in accordance with the advancing state. When the shift advancing state indicates a first reference value, engagement of the third engagement element is started by increasing the hydraulic pressure of the hydraulic servo for the third engagement element, and when the shift advancing state further indicates a second reference value, the third engagement element is engaged completely by further increasing the hydraulic pressure. When the shift advancing state indicates a third reference value indicating the advancing state between the first and the second reference values, disengagement of the second engagement element is started by decreasing the hydraulic pressure of the hydraulic servo for the second engagement element.

In addition, the shift control means controls a disengaging operation until the second engagement element starts disengaging in accordance with a state of the first engagement element.

Next, a state of the first engagement element indicates the shifting state that varies depending on the disengaging operation of said first engagement element, the second engagement element is controlled with respect to the operation until the start of disengagement thereof by decreasing the hydraulic pressure of the hydraulic servo for the second engagement element, and lowering characteristics of the hydraulic pressure is controlled based on a judgment with respect to the shifting state.

The state of said first engagement element indicates the shifting state that varies depending on the disengaging operation of the first engagement element, the second engagement element is controlled with respect to the operation until the start of disengagement thereof by decreasing the hydraulic pressure of the hydraulic servo for the second engagement element, and a timing for the start of lowering the hydraulic pressure is controlled based on the judgment of the shifting state.

Shifting from the first speed to the second speed is achieved via a third speed, the third speed is achieved by engaging one of the four engagement elements and disengaging the other engagement element simultaneously from the first speed, and the second speed is achieved by activating the remaining two engagement elements from the third speed, and the shifting state indicates the shifting state from the first speed to the third speed.

The shifting state is judged using an index indicating an input/output revolution of the transmission that varies during shifting to a predetermined speed, and lowering of the hydraulic pressure of the hydraulic servo for the second engagement element is started when the index becomes a predetermined value.

Alternatively, the shifting state is judged using an index indicating an engagement force of the third engagement element to be engaged, and lowering of the hydraulic pressure of the hydraulic servo for the second engagement element to be disengaged is started when engagement of the third engagement element to be engaged is started.

The engagement force of the third engagement element to be engaged is predicted based on the hydraulic pressure to the hydraulic servo for the third engagement element, and lowering of the hydraulic pressure to the hydraulic servo for the second engagement element to be disengaged is started when the hydraulic pressure of the hydraulic servo for the third engagement element to be engaged becomes a predetermined hydraulic pressure or higher.

A state of the shifting is judged using an index indicating a time taken from shifting start to a predetermined speed, and lowering of the hydraulic pressure to the hydraulic servo for the second engagement element to be disengaged is started at an elapse of a predetermined time from the shifting start.

The index is set to the input shaft revolution of the transmission, the predetermined value is set to a predicted revolution from the revolution acceleration during shifting based on a time elapsing until the second engagement element to be disengaged starts slipping, and lowering of the hydraulic pressure to the hydraulic servo for the second engagement element to be disengaged is started when the input shaft revolution becomes the predicted revolution.

Lowering of the hydraulic pressure is set such that the hydraulic pressure is lowered by a predetermined quantity along with the advancement of the state of shifting to a predetermined speed.

Alternatively, the lowering of the hydraulic pressure is set to a value obtained by adding a hydraulic pressure corresponding to a safety factor to a hydraulic pressure corresponding to an input torque, and the hydraulic pressure corresponding to the safety factor is reduced in accordance with a state of shifting from the first speed to the third speed.

The shifting from the first speed to the second speed is performed by a kick-down shifting through depression of an accelerator pedal.

Next, the shifting from the first speed to the second speed is achieved via the third speed, the third speed is achieved by engaging one of the four engagement elements and disengaging the other engagement element simultaneously from the first speed, and the second speed is achieved by activating the remaining two engagement elements from the third speed.

The third speed is set between the first and second speeds, and the shifting is performed through a skip shifting.

Further, the third engagement element is engaged during shifting to the third speed, the first engagement element is disengaged during shifting to the third speed, the fourth engagement element is engaged during shifting to the second speed, and the second engagement element is disengaged during shifting to the second speed.

Furthermore, the fourth engagement element may be a one-way clutch.

Next, engagement of the third engagement element may be controlled in accordance with an advancing state of shifting that varies depending on the disengagement state of the first engagement element.

The engagement of the fourth engagement element may be controlled in accordance with an advancing state of shifting that varies depending on the disengagement state of the second engagement element.

Alternatively, the engagement of the fourth engagement element may be controlled in accordance with an advancing state of shifting that varies depending on the engagement state of the third engagement element.

In addition, a control start timing for the fourth engagement element is controlled in accordance with an advancing state of shifting that varies depending on the engagement state of the third engagement, and the control is started after the third engagement element is completely engaged.

Alternatively, the control start timing of the fourth engagement element is controlled in accordance with an advancing state of shifting that varies depending on the engagement state of the third engagement element, and control of the fourth engagement element is started simultaneously with the start of controlling the third engagement element, and maintained until a timing for starting engagement of the fourth engagement element at a low pressure in accordance with the disengagement state of the second engagement element.

In general, in a transient state of shifting in which four engagement elements are associated with each other, it is assumed that there occurs a state in which all of the four engagement elements slip. If such slipping state continues for a long time, the shift state of the shift mechanism is advanced disorderly, thereby resulting in significant shift shock when the shift is completed. In addition, if there occurs a state in which the engagement elements in the disengagement and engagement sides are completely engaged with each other simultaneously, the advancement of the shift temporarily stops. Then, the engagement element on the disengagement side starts slipping and enters into the next shift state. Thus, shift falls into two stages, which makes a driver feel uncomfortable. Even if engagement of the engagement side element on the engagement side and disengagement of the engagement element on the disengagement side can start simultaneously at a good timing so as to ensure a shift state where only one engagement element is always engaged for avoiding occurrence of any of the above states, shift speed is inevitably retarded temporarily because the disengagement of the disengagement side element proceeds gradually, and the driver may feel two-stage shifting like the complete engagement state of two engagement elements. Therefore, in order to advance shifting in an ideal state, and cause the shifting to be performed continuously without causing two-stage shifting, it is necessary that the period in which the slip states of the four engagement elements occurs is minimized while maximizing the shifting state in which only one engagement element is completely engaged. At the same time, a complete engagement state of two elements on the transient disengagement and engagement sides in the middle of shifting must be prevented.

According to an aspect of the invention, disengagement of the fourth engagement element is started after disengagement of the first engagement element has been started; engagement of the fourth engagement element is started after engagement of the third engagement element has been completed, thereby making it possible to minimize a shift state in which all of the four engagement elements slip, and maximize the shifting time in which only one engagement element is completely engaged. Moreover, disengagement of the second engagement element is started before completing engagement of the third engagement element, thereby making it possible to perform shifting which prevents a transient state in which two engagement elements are completely engaged with each other simultaneously. Thus, as described above, shifting can be performed free from two-stage shifting while advancing shifting in an ideal state.

In addition, according to another aspect of the invention, disengagement of the second engagement element is started just before completing engagement of the third engagement element (complete engagement), thus making it possible to substantially shorten the period in which four engagement elements slip.

Further, according to another aspect of the invention, by starting disengagement of the second engagement element after the start of engaging the third engagement element and before completing the engagement (complete engagement), retardation of shift caused by the start of engaging the third engagement element is offset by revving of the engine owing to slip of the second engagement element, thus making it possible to continuously smoothen the entire shift.

Next, according to another aspect of the invention, hydraulic pressure is controlled based on a reference value indicating an advancement state of a detected shift, making it possible to control each engagement element accurately at a target timing.

According to another aspect of the invention, the operation of the second engagement element is controlled according to an engagement state of the first engagement element until the second engagement element starts disengaging, thus making it possible to timely start disengaging the second engagement element, and improve shift continuity more significantly.

Further, according to another aspect of the invention, the operation of the second engagement element can be adjusted by controlling characteristics of the second engagement element having a hydraulic pressure of a hydraulic servo lowered until it starts disengaging, thus making it possible to properly perform timing adjustment relative to engagement start of the third engagement element conforming to judgment of the shifting state.

According to another aspect of the invention, the operation of the second engagement element can be adjusted by controlling a start timing of lowering the hydraulic pressure of the hydraulic servo for the second engagement element until it starts disengaging, thus making it possible to perform timing adjustment relative to engagement start of the third engagement element more properly conforming to a judgment of the shift state.

Next, according to another aspect of the invention, shifting from the first speed to the second speed is switched by shifting from the third speed to the second speed achieved by operating two engagement elements via shifting from the first speed to the second speed achieved by operating two engagement elements. This eliminates the need of controlling three or more engagement elements simultaneously, thus improving controllability, and preventing shift shock. Moreover, during shifting, disengagement of the second engagement element for shifting from the third speed to the second speed is controlled according to a state of shifting from the first speed to the third speed, rendering continuity to shifting. This makes it possible to ensure driving comfort.

Further, according to another aspect of the invention, lowering of the hydraulic pressure of the hydraulic servo for operating the second engagement element to be disengaged is started in accordance with the input/output revolution as an index that varies during shifting to a predetermined speed. As the hydraulic pressure of the hydraulic servo for an engagement element to be disengaged prior to shifting to the second speed starts lowering, start of shifting to the second speed can be performed without a time lag, thus reducing the shifting time.

According to another aspect of the invention, by lowering the hydraulic pressure of the hydraulic servo for the second engagement element to be disengaged associated with the start of engaging the third engagement element to be engaged during shifting to a predetermined speed, the revving of the engine owing to excessive decrease in the hydraulic pressure of the engagement element, that is, slipping, can be suppressed using torque (engagement force) of the third engagement element to be engaged. As a result, the revving of the engine at the end of shifting can be reduced.

Further, according to another aspect of the invention, a sensor for detecting a torque is not required, thus ensuring cost reduction.

According to another aspect of the invention, the start of lowering the hydraulic pressure to the second engagement element to be disengaged after the elapse of a predetermined time from the start of shifting to a predetermined speed, lowering of the hydraulic pressure of the second engagement element can be started with a very simple construction, thus eliminating the need for an increase in the memory capacity of the control apparatus.

According to another aspect of the invention, a time elapsing until the second engagement element starts slipping is set, and a revolution for starting the lowering of the hydraulic pressure to an engagement element to be disengaged from the set time is calculated by revolution acceleration. As a result, shifting to the second speed can be started without a time lag, and revving of the engine due to the slip of the second engagement element to be disengaged at the end of shifting to a predetermined speed can be prevented.

Further, according to another aspect of the invention, a lowering degree of the hydraulic pressure applied to the second engagement element to be disengaged is reduced by a predetermined quantity as a state of shifting to a predetermined speed advances. As the hydraulic pressure to the second engagement element becomes relatively higher in the state where the shifting is not advanced, the revving of the engine or the like in the middle of shifting to a predetermined speed can be prevented. Furthermore, since the hydraulic pressure to the second engagement element is lowered as the shifting state advances, shifting to the second speed can be started with no time lag.

According to another aspect of the invention, a standby hydraulic pressure to an engagement element to be disengaged can be theoretically set to the hydraulic pressure in accordance with an input torque to be inputted to the transmission such that the engagement element can be maintained without slipping. Actually, however, the hydraulic pressure has been conventionally set to include a marginal safety factor in consideration of dispersion in engagement properties or aging among individual transmissions. If the safety rate is an excessively large value, the start of shifting to a predetermined speed will be delayed. On the other hand, if it is an excessively small value, the engagement element slips to cause the engine to rev when the dispersion exceeds the safety factor. Therefore, the safety factor is sequentially reduced from the maximum value to the minimum value according to the degree of advancement of shifting such that delay in the start of shifting and revving of the engine at the end of shifting can be prevented.

According to another aspect of the invention, the response to a kick-down shifting can be improved, thus making it possible to cope with the driver's request promptly.

According to another aspect of the invention, shifting from the first speed to the second speed is switched by shifting from the third speed to the second speed achieved by operating two engagement elements via shifting from the first speed to the second speed achieved by operating two engagement elements. This eliminates the need of controlling three or more engagement elements simultaneously, thus improving controllability, and preventing shift shock. Moreover, shifting can be continuously performed by controlling the hydraulic pressure of the hydraulic servo for the engagement element to be disengaged during shifting from the third to the second speed. This makes it possible to improve driving comfort.

Further, according to another aspect of the invention, the third speed is set between the first and second speeds, and the hydraulic pressure of the hydraulic servo for an engagement element to be disengaged during shifting from the third speed to the second speed is controlled according to a state of shift to the second shift stage. As a result, shifting to the second speed can be started with no time lag, thus reducing the shift time.

Next, according to another aspect of the invention, only one engagement element is disengaged for shifting from the third speed to the second speed, and there is no need for complicated control to simultaneously control disengaging of two engagement elements according to a state of shifting to the second shift stage, further improving controllability and prevention of shift shock.

Next, according to another aspect of the invention, shifting from the third speed to the second speed can be performed by simply operating the second engagement element on the disengagement side, simplifying the control.

Next, according to another aspect of the invention, the third engagement element is engaged and controlled according to a state of shifting that varies depending on the engagement state of the first engagement element, preventing unnecessary revving or tie-ups of the engine. Tie-ups means a state in which an engagement element is engaged too early in a grip change.

Next, according to another aspect of the invention, the fourth engagement element is engaged and controlled according to a state of shifting that varies depending on the engagement state of the first engagement element, preventing unnecessary or tie-ups of the engine.

Next, according to another aspect of the invention, the fourth engagement element is engaged and controlled according to a state of shifting that varies depending on the engagement state of the third engagement element, preventing the increase in shifting time or tie-ups.

Next, according to another aspect of the invention, control of the fourth engagement element is started after completing engagement of the third engagement element so as to reliably prevent tie-ups.

Next, according to another aspect of the invention, control of the fourth engagement element is started simultaneously with the start of controlling the third engagement element, thus making it possible to reduce the shifting time. Additionally the fourth engagement element is maintained at a predetermined low pressure with no torque until a predetermined timing, that is, at a hydraulic pressure corresponding to a spring load, thus preventing tie-ups.

BRIEF DESCRIPTION OF THE DRAWINGS

These and other objects and advantages of the invention will become clear from the following description with reference to the accompanying drawings, wherein:

FIG. 20 is a timing chart showing a hydraulic control of the servo using the control apparatus according to the invention.

DETAILED DESCRIPTION OF PREFERRED EMBODIMENTS

Figure 1:
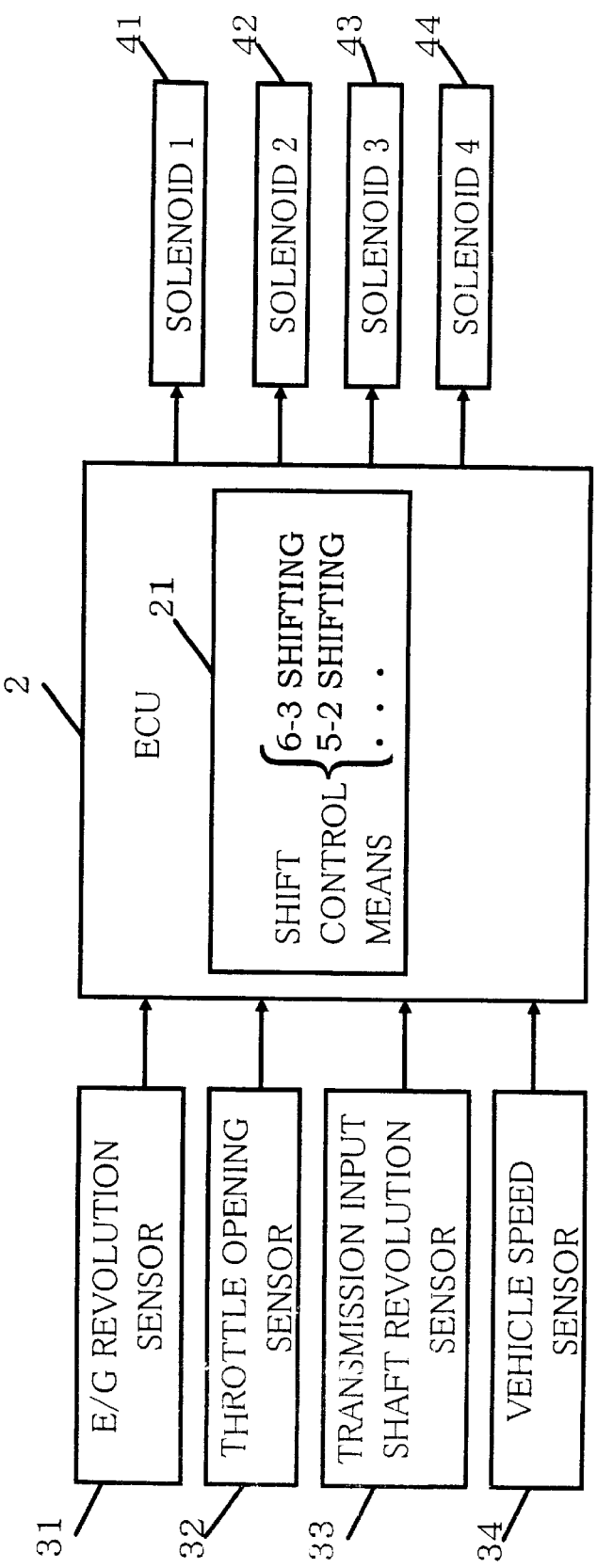
FIG. 1 is a lock diagram showing a system configuration of a signal system of a control apparatus for an automatic transmission according to the invention.

Now, preferred embodiments of the invention will be described with reference to the accompanying drawings. FIGS. 1 to 11 show an automatic transmission to which a shift control apparatus of the invention has been applied. FIG. 1 is a block diagram of a system configuration of a signal system of the control apparatus. As shown in the drawing, this control apparatus is provided with an electronic control unit (ECU) 2 as a core element thereof; various sensors 31–34 as input means for inputting various information thereto. An engine (E/G) revolution sensors 31 detects an engine revolution of a vehicle; a throttle opening sensor 32 detects an engine load; a shift input shaft revolution sensor 33 detects the input rotation of the shift; and a vehicle speed sensor 34 detects a vehicle speed from the output shaft rotation of the shift. The control apparatus is further composed of a plurality of solenoids as output means activated by an output of a driving signal based on control information, that is, solenoids 1 to 4 as actuators of solenoid valves 41 to 44 arranged at a hydraulic control unit described later in detail with reference to FIG. 5.

Figure 2:
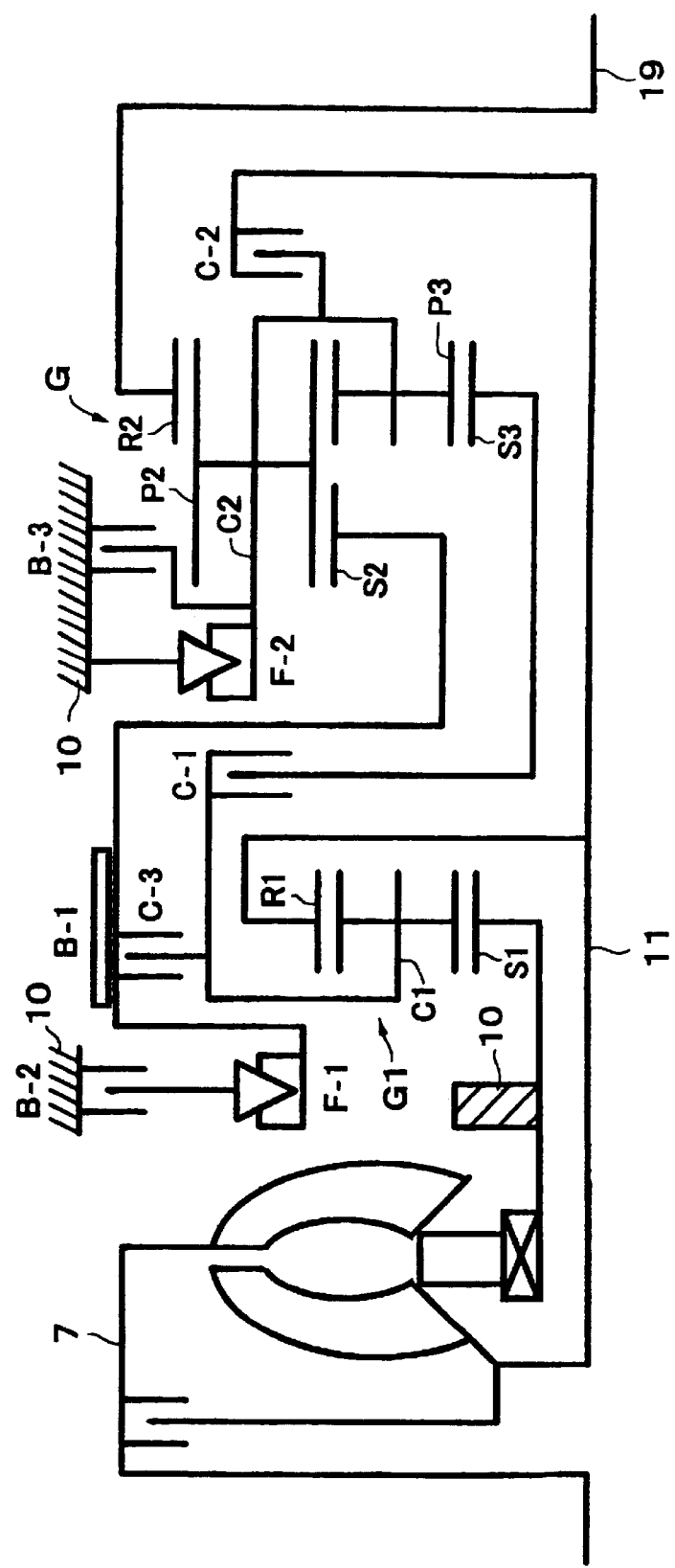
FIG. 2 is a skeleton diagram showing a gear train of the automatic transmission.

FIG. 2 is a skeleton diagram of a 6-gear train for a rear wheel drive (FR) vehicle as an example of a shift mechanism control by the above mentioned control apparatus. This gear train is composed of a shift mechanism of forward 6-speed stage and 1 reverse stage consisting of a combination of a torque converter 7 with a lockup clutch, a planetary gear set G of Ravigneaux type including a speed reducing gear G1 of simple planetary type.

The planetary gear set G consisting essentially of the shift mechanism includes two sun gears S2 and S3 each having different diameter, one ring gear R2; a long pinion gear P2 externally geared with a large-diameter sun gear S2 and internally geared with the ring gear R2; a short pinion gear P3 externally geared with a small-diameter sun gear S3 and externally geared with the long pinion gear P2; and a gear set of Ravigneaux type consisting of a carrier C2 for supporting both pinion gears P2 and P3. The small-diameter sun gear S3 of the planetary gear set G is coupled to a multi-plate configured clutch (C-1) (hereinafter, a reference numeral is given immediately following each engagement element); the large-diameter sun gear S2 is coupled with a multi-plate configuration clutch C-3 and can be engagingly locked with an automatic transmission case 10 by means of a brake B-1 composed of a band brake, and further, can be engagingly locked with the automatic transmission case 10 by means of a one-way clutch F-1 parallel thereto and a multi-plate configured brake B-2. In addition, the carrier C2 is coupled with an input shaft 11 via clutch C-2, as an engagement element of multi-plate configuration. The carrier C2 can be engagingly locked with the transmission case 10 by a multi-plate configured brake B-3, and can be unidirectionally rotated and engagingly locked with the transmission case 10 by a one-way clutch F-2. The ring gear R2 is coupled with an output shaft 19.

The deceleration planetary gear G1 is composed of a simple planetary gear, a ring gear R1 as its input element coupled with the input shaft 11, a carrier C1 as an output element coupled with the small-diameter sun gear S3 via the clutch C-1, and coupled with the large-diameter sun gear S2 via the clutch C-3, and a sun gear S1 as a fixing element for obtaining resistance force fixed to the transmission case 10.

Figures 3, 4:
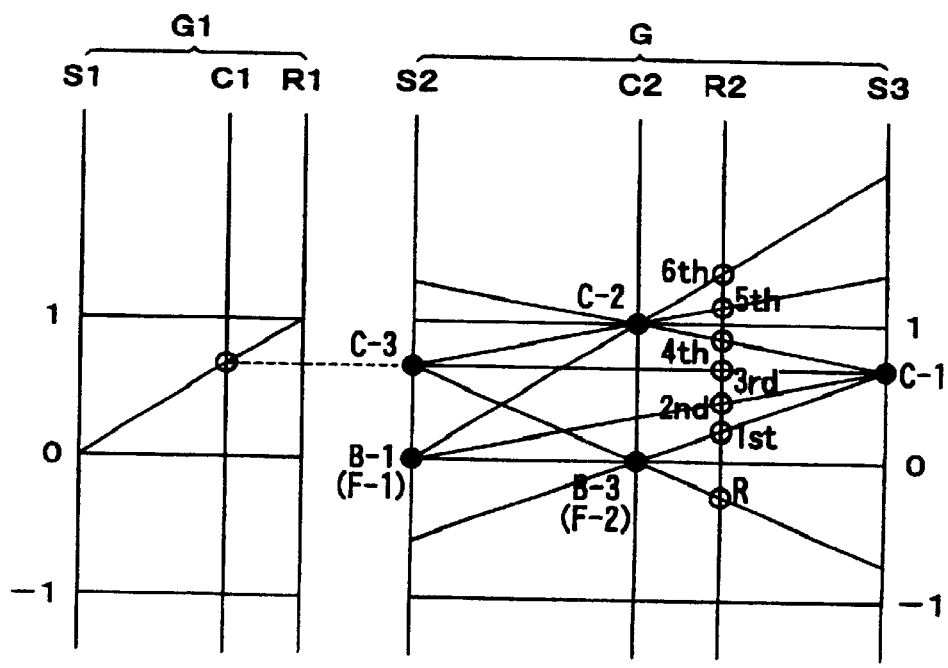
FIG. 3 is a table showing an engagement-disengagement relationship between each speed and each engagement element achieved by the gear train.
FIG. 4 is a graph depicting velocity of the gear train.

In the case of this automatic transmission, a relationship between engagement elements, that is, between engagement and disengagement of clutches, brakes, and one-way clutches and shift stages is shown in an engagement chart of FIG. 3. In this engagement chart, the mark O designates engagement, no-mark designates disengagement, the mark Δ designates engagement for engine brake achievement, and the mark ● designates engagement that does not directly influence achievement of a shift stage. In addition, FIG. 4 is a speed graph showing a relationship between a shift stage achieved by engagement of each of the clutches, brakes, and one-way clutches (● designates engagement thereof) and revolution rate of each engagement element at that time.

As is evident by referring to these figures, a first speed (1st) is achieved by engagement between clutch C-1 and brake B3. As is evident by referring to the activation chart, automatic engagement of one-way clutch F-2 is employed instead of engagement of brake B-3. Reasons why this engagement is employed and why this engagement corresponds to engagement of brake B-3 are as follows: The one-way clutch F-2 for releasing engagement force itself together with engagement of brake B-1 is employed to avoid complicated hydraulic control for grip change of brakes B-3 and B-1 during 1→2 shifting described later in detail and to simplify disengagement control of brake B-3, which is identical to engagement of brake B-3. In this case, rotation decelerated from the input shaft 11 via deceleration planetary gear G1 is inputted to the small-diameter sun gear S3 via clutch C-1, resistance force is obtained for carrier C2 engagingly locked by engagement of one-way clutch F-2, and deceleration rotation of the maximum deceleration rate of ring gear R2 is outputted to an output shaft 19.

Next, a second speed (2nd) is achieved by engagement between clutch C-1 and one-way clutch F-1 corresponding to engagement between clutch C-1 and brake B-1 and engagement of brake B-2 that enables these engagements. (The reason why these engagements correspond to engagement of brake B-1 will be described later in detail) In this case, rotation decelerated from input shaft 11 via deceleration planetary gear G1 is inputted to small-diameter sun gear S3 via clutch C-1; the resistance force of large-diameter sun gear S2 engagingly locked by engagement between brake B-2 and one-way clutch F-1 is obtained, and deceleration rotation of ring gear R2 is outputted to the output shaft 19. At this time, the deceleration rate is lower than the first speed (1st) as shown in FIG. 4.

A third speed (3rd) is achieved by simultaneous engagement of clutches C-1 and C-3. In this case, rotation decelerated from the input shaft 11 via deceleration planetary gear G1 is inputted to the large-diameter sun gear S2 and the small-diameter sun gear S3 simultaneously via clutches C-1 and C-3; planetary gear set G is directly connected, and rotation of the ring gear R2 that is the same as input rotation for both of the sun gears S2 and S3 is outputted to the output shaft 19 as rotation decelerated with respect to the rotation of input shaft 11.

Further, a fourth speed (4th) is achieved by simultaneous engagement of clutches C-1 and C-2. In this case, rotation decelerated from the input shaft 11 via deceleration planetary gear G1 is inputted to the small-diameter sun gear S3 via clutch C-1 while non-deceleration rotation inputted from the input shaft 11 via clutch C-2 is inputted to carrier C2.

Intermediate rotation of these two inputted rotations are outputted to the output shaft 19 as rotation of ring gear R2 slightly decelerated for rotation of input shaft 11.

Next, a fifth speed (5th) is achieved by simultaneous engagement of clutches C-2 and C-3. In this case, rotation decelerated from the input shaft 11 via deceleration planetary gear G1 is inputted to the large-diameter sun gear S2 via clutch C-3 while non-deceleration rotation inputted from the input shaft 11 via clutch C-2 is inputted to carrier C2. Rotation slightly accelerated to be higher than that of the input shaft 11 of the ring gear R2 is outputted to the output shaft 19.

A sixth speed (6th) is achieved by engagement of clutch C-2 and brake B-1. In this case, non-deceleration rotation is inputted from the input shaft II to carrier C2 only via clutch C-2, resistance force is obtained for sun gear S2 engagingly locked by engagement of brake B-1, and the further accelerated rotation of the ring gear R2 is outputted to the output shaft 19.

Reverse stage (R) is achieved by engagement between clutch C-3 and brake B-3. In this case, rotation decelerated from input shaft 11 via deceleration planetary gear G1 is inputted to the large-diameter sun gear S2 via clutch C-3; resistance force is obtained for carrier C2 engagingly locked by engagement of brake B-3, and reverse rotation of the ring gear R2 is outputted to the output shaft 19.

Hereinafter, a relationship between one-way clutch F-1 and each of brakes B-1 and B-2 mentioned previously will be described. The engagement direction of the one-way clutch F-1 coupled with the large-diameter sun gear S2 is set along a resistance force torque support direction at the second speed of the large-diameter sun gear S2, thereby making it possible for one-way clutch F-1 to function in substantially the same manner as engagement of brake B-1. However, unlike the carrier C2, the large-diameter sun gear S2 is not only engaged to obtain an engine brake effect during the second gear stage, but also requires brake B-1 because the large-diameter sun gear S2 is a shifting element to be engagingly locked for achieving the sixth speed. In addition, as is evident from the speed graph of FIG. 6, the large-diameter sun gear S2 rotates in reverse direction to input rotation direction at the achievement of the first speed (1st). In the case of the third gear stage or higher, the large-diameter sun gear S2 rotates in the same direction as the input rotation direction. Therefore, one-way clutch F-1 cannot be directly coupled with a fixing member, and thus, is constructed so that the effectiveness of an engagement state can be controlled in alignment with the brake B-2.

Each of the thus achieved speeds becomes a proper speed step with its relatively constant intervals for each gear step as is qualitatively evident by referring to vertical intervals marked with O indicative of a speed ratio of the ring gear R2 on the speed graph of FIG. 4. This gear train does not require multiple grip change of engagement elements while upshifting/downshifting between general adjacent speeds, but requires the grip change in a skip shifting. Namely, the downshift requiring skip shifting corresponds to 6→3 skip shift and 5→2 skip shift (however, in this shifting, the brake B-2 is always engaged for simplification of control in the second or higher speeds, and thus, automatic engagement of one-way clutch F-1 serves as engagement of brake B-1).

Figure 5:
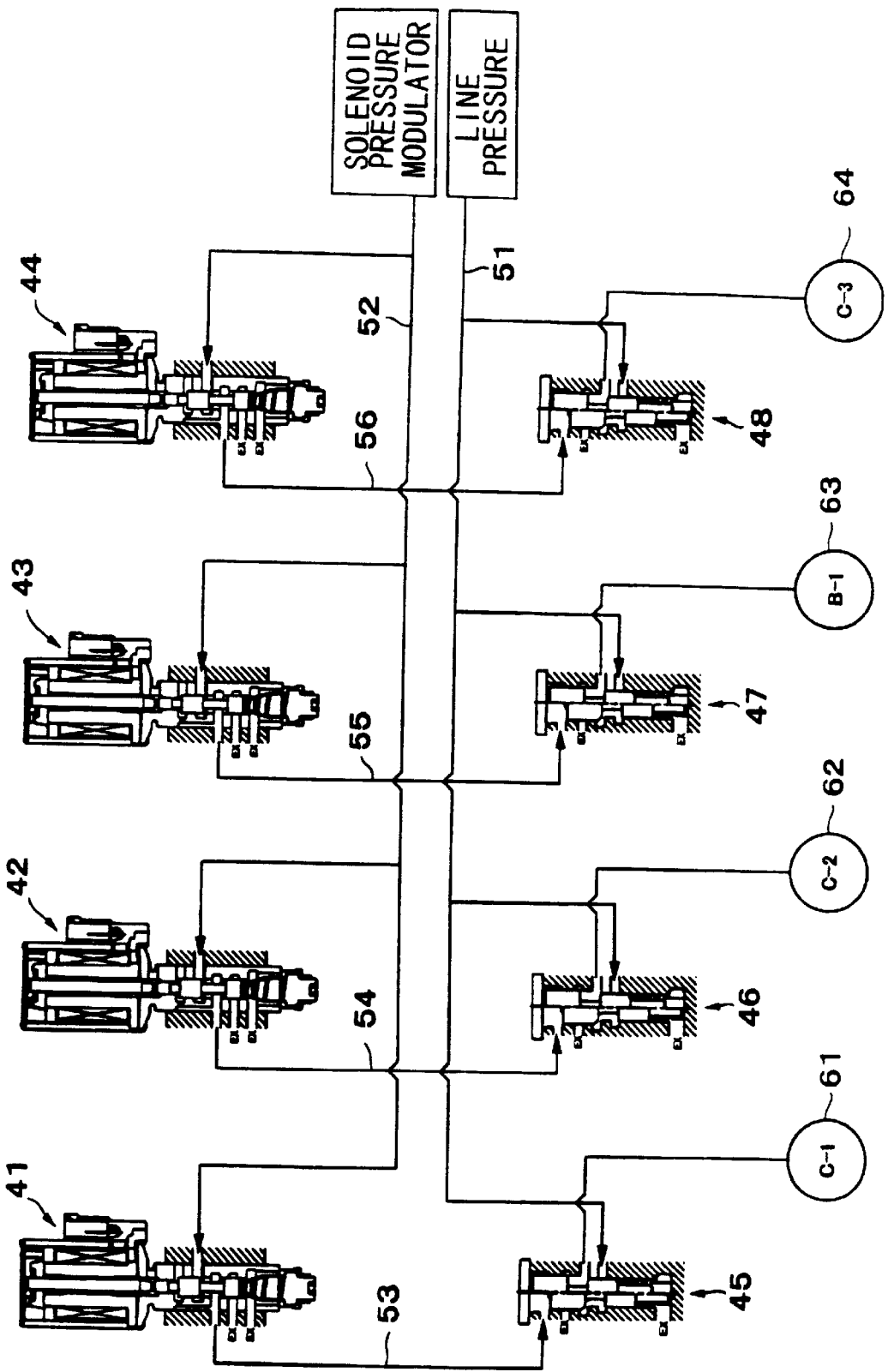
FIG. 5 is a hydraulic circuit diagram showing an operating system of a control apparatus.

A hydraulic control unit controls the shift mechanism by operation of the hydraulic servo of each of the clutches and brakes. The hydraulic servo of each engagement element is directly controlled individually by means of its own solenoid valve via a solenoid driving signal from electronic control unit 2 so as to achieve the above skip shifting easily. FIG. 5 shows a specific circuit diagram. As shown in the drawing, in this hydraulic circuit, each of control valves 45 to 48 is connected in parallel to a line pressure oil passage 51 connected to a supply circuit of a line pressure (the maximum circuit pressure capable of engaging the engagement elements with each other according to a vehicle travel load) depicted by a block diagram. Each control valve is constructed to be activated at a controlled pressure according to the solenoid pressures applied by the respective solenoid valves 41 to 44.

Specifically, the hydraulic servo 61 of clutch C-1 is connected to a line pressure oil passage 51 via the C-1 control valve 45, and the spool end of the C-1 control valve 45 is connected to an oil passage 52 of a solenoid pressure modulator via a solenoid valve 41 (oil pressure in which a line pressure is reduced via the modulator valve via the solenoid valve 41). The C-1 control valve 45 is a spool valve provided with a land with both ends having different diameters. A solenoid signal pressure is applied to a large-diameter land end against a spring load applied to a small-diameter land. In this manner, a construction is adopted such that a drain port is closed at the large-diameter land; the line pressure oil passage 51 and the hydraulic servo 61 are communicated with each other while a space between an IN port communicating with the line pressure oil passage 51 and an OUT port communicating with a hydraulic servo 61 is throttled by the small-diameter land; the IN port is closed at the small-diameter land by disengagement of the solenoid pressure; and the hydraulic servo 61 is drain-connected by releasing a drain port at the large-diameter land. On the other hand, the solenoid valve 41 is an always opened linear solenoid valve. Similarly, a construction is adopted such that throttle between the solenoid modulator pressure oil passage 52 and the solenoid pressure oil passage 53 is adjusted at a load applied to a plunger against a spring load applied to one end of a spool having a land at both ends thereof, and a drain quantity of the solenoid pressure oil passage 53 is adjusted, thus adjusting the solenoid pressure. For the other clutch C-2, brake B-1, and clutch C-3, there is adopted a parallel circuit configuration consisting of similar control valves 46, 47, and 48; solenoid valves 42, 43, and 44; and solenoid pressure oil passages 54, 55, and 56 for communicating these valves with each other.

The thus constructed automatic transmission requires activation of four engagement elements (clutches C-1, C-2, and C-3; and brake B-1), for example, during 6→3 shifting in which when a first shifting position is set to a sixth speed, a third speed separated by two gears from the sixth speed is a second shifting position. In this case, a first shifting position (sixth speed) is achieved by engagement of the first and second engagement elements (brake B-1 and clutch C-2), and a second shifting position (third speed) is achieved by engagement of the third and fourth engagement elements (clutches C-1 and C-3). In addition, in the case where a first shifting position is a fifth speed, when attempting shifting from the fifth speed to the second speed separated by two stages, it also requires activation of four engagement elements (clutches C-1, C-2, and C-3, and one-way clutch F-1). In this case, the first engagement element is clutch C-2, the second engagement element is clutch C-3, the third engagement element is clutch C-1, and the fourth engagement element is the one-way clutch F-1. For such shifting, a shift control apparatus according to the invention is provided with shift control means 21 (shown in FIG. 1) for starting disengagement of the second engagement element (clutch C-2 or clutch C-3) after starting disengagement of the first engagement element (brake B-1 or clutch C-2); completing engagement of the fourth engagement element (clutch C-3 or one-way clutch F-1) after completing engagement of the third engagement element (clutch C-1); and starting disengagement of the second engagement element (clutch C-2 or clutch C-3) before completing engagement of the third engagement (clutch C-1).

Such disengagement and engagement of these engagement elements may include a transient slip state leading to complete disengagement/engagement. Therefore, starting disengagement denotes that the engagement elements start slipping. In terms of engagement elements in which this starting is operated by hydraulic pressure, starting disengagement denotes that slipping is started by lowering the engagement force. In terms of a one-way clutch free of hydraulic operation, starting disengagement denotes that the clutch becomes free along with a change in rotational direction of a rotating member. Similarly, completing engagement denotes that the engagement elements no longer slip. Therefore, completing engagement denotes that the engagement elements operated by hydraulic pressure never slip due to the increase in engagement force, and that engagement elements free of hydraulic operation are locked with the rotational direction change of the rotation member.

In the invention, the shift control means 21 is further achieved by activation of two engagement elements (clutch C-1 and brake B-1) of the above four engagement elements for a first shifting position (sixth speed or fifth speed) and a second shifting position (third speed or second speed); the means 21 sets a third shifting position (fourth speed or third speed) in which the second shifting position (third speed or second speed) is achieved by activation of the remaining two engagement elements; and the means 21 switches shifting from the first shifting position (sixth speed or fifth speed) to the second shifting position (third speed or second speed) to shift from the third shifting position (fourth speed or third speed) to the second shifting position (third speed or second speed) via shifting from the first shifting position (sixth speed or fifth speed) to the third shifting position (fourth speed or third speed). In this case, the four engagement elements are: clutch C-1 engaged during shifting to the third shifting position (fourth speed or third speed); brake B-1 or clutch C-2 disengaged during the shifting; clutch C-3 or one-way clutch F-1 engaged during shifting to the second shifting position (third speed or second speed); and clutch C-2 or clutch C-3 disengaged during the shifting.

Next, a specific construction of the shift control means 21 will be described by way of example of 6→3 shifting. In the illustrative embodiment, the shift control means 21 is constructed as a program in the control apparatus; shifting is performed by controlling the hydraulic servos 61 to 64 for each engagement element through activation of the solenoid valve 41 to 44 using a solenoid driving signal outputted based on the program. Hereinafter, a control flow of the shift control means 21 will be described for each engagement element.

Figure 6:
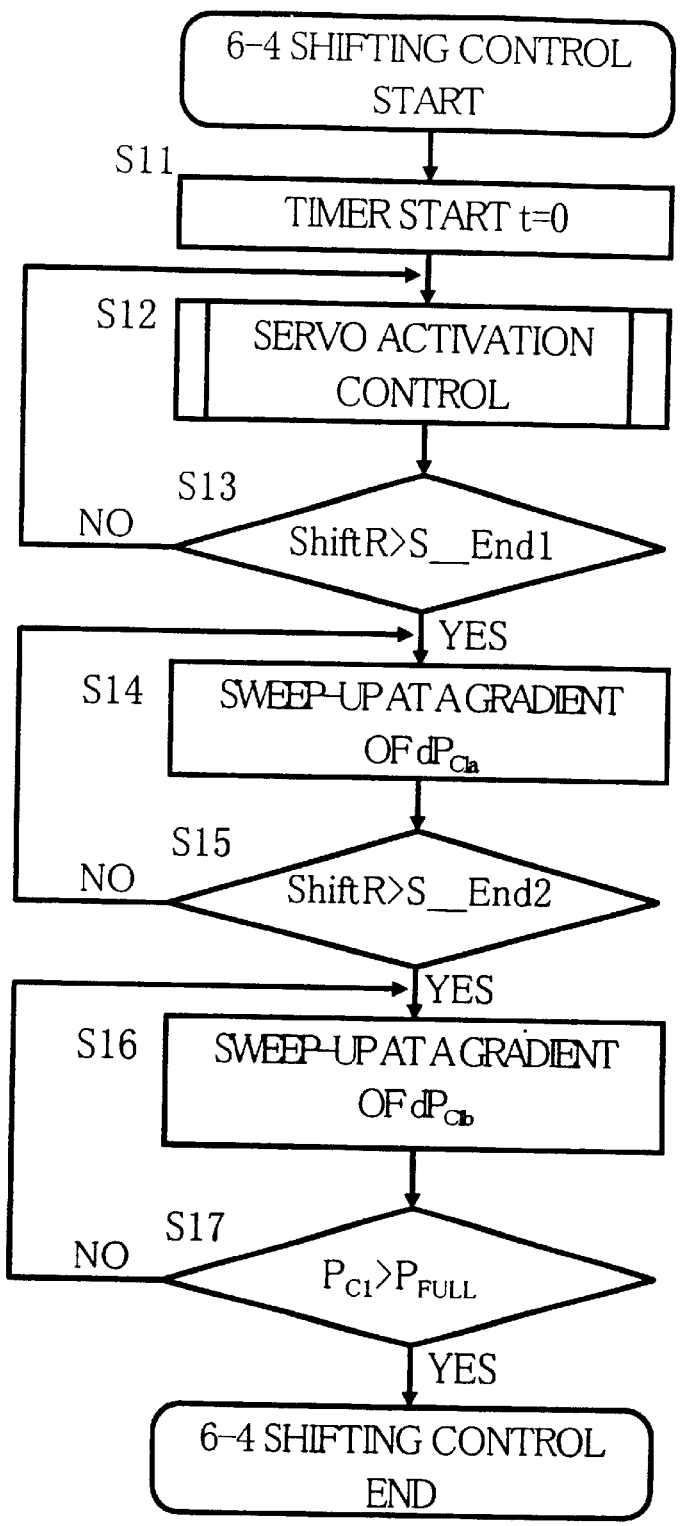
FIG. 6 is a flowchart showing C-1 clutch engagement control during 6→3 shifting.

First, a control flow of engaging clutch C-1 as a third engagement element is shown in FIG. 6.

[C-1 Engagement Control]

In this control, a timer is started in the beginning step S11 (timer start t=0). Second, servo activation control subroutine processing is performed in step S12. This processing is intended to maintain the subsequent piston stroke pressure for reducing a space between a first fill of hydraulic pressure for filling the inside of a hydraulic servo cylinder of clutch C-1 and a hydraulic servo piston and friction member of an engagement element, and is well known as being generally performed for clutch engagement. Then, an advancing state (Shift R) is judged as an index for judging advancement of shifting in step S13 (Shift R>S_End 1). This shift advancing state (Shift R) can be the index for judging an input shaft revolution or a hydraulic pressure of the hydraulic servo, and however, in the invention, the input/output shaft revolution is represented as the index expressed by the formula below.

Shift $R$=(transmission input revolution−gear ratio before shifting× transmission output revolution)×100/transmission output revolution×(gear ratio after shifting−gear ratio before shifting)[%]

The Shift R may be set to, for example, 70% and is calculated based on a detected value by the transmission input shaft revolution sensor 33 and the vehicle sensor 34 shown in FIG. 1. The judgment becomes No at the initial stage, and thus, is continued until shifting further advances, i.e., the judgment becomes Yes. When the judgment becomes Yes, a pressure increase for starting engagement of clutch C-1 is started in step S14 (sweep-up at a gradient of $dP_{c1a}$). Specifically, this processing denotes that a drive signal current value for solenoid 1 is controlled; the solenoid valve 41 shown in FIG. 5 is activated to perform pressure adjustment, and the hydraulic pressure of the hydraulic servo by the control valve 45 is increased at a gradient of $dP_{c1a}$ at the resultant solenoid pressure (the relationship between this driving signal and the servo pressure is similar in all the following hydraulic control). While the above pressure increase is continued, it is judged whether or not shifting reaches 90%, for example, before synchronization of the fourth speed from the advancing state (Shift R) in the next step S15 (Shift R>S_End 2). This judgment also becomes No at the initial stage, and sweep-up is continued by repeating a loop for returning to step S14 until the shifting advances to establish Yes of the judgment. When the judgment in step S15 is Yes, processing for increasing pressure up to a line pressure is performed to reliably maintain engagement of clutch C-1 in step S16 (sweep-up at a gradient of $dP_{c1b}$). During this period, it is repeatedly judged whether or not the servo hydraulic pressure reaches a line pressure in the next step S17 ($P_{c1}>P_{FULL}$). Thus, when the judgment in step S17 is Yes, 6–4 shifting control for controlling engagement of clutch C-1 ends.

Figure 7:
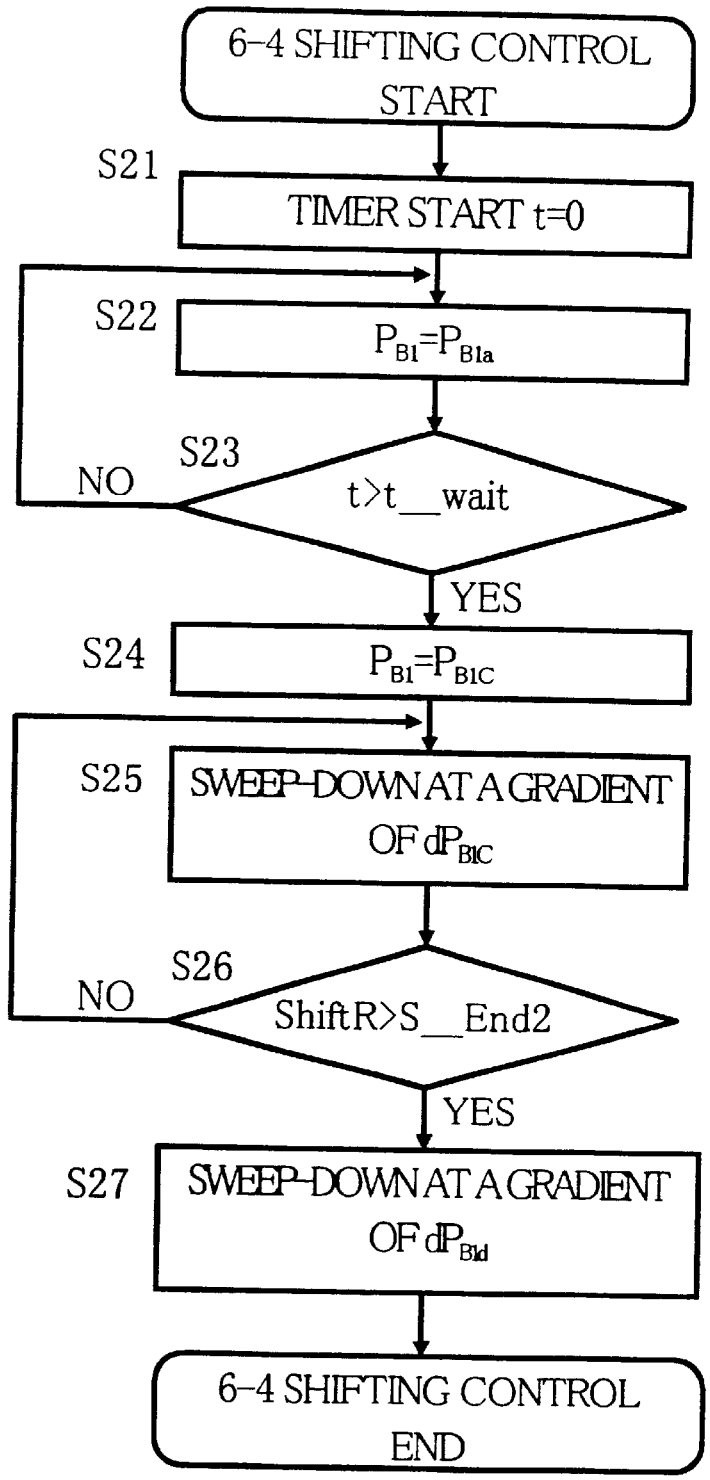
FIG. 7 is a flowchart showing B-1 brake disengagement control during 6→3 shifting.

Next, a control flow for releasing brake B-1 that is a first engagement element is shown in FIG. 7.

[B-1 Disengagement Control]

This control is started simultaneously with 6–4 shift control for controlling the previous C-1 clutch engagement. Like the previous control, a timer is started in step S21 (timer start t=0). Next, in step S22, processing is performed for maintaining the servo hydraulic pressure to a predetermined pressure that is slightly lower than a pressure (line pressure) capable of temporarily maintaining engagement reliably ($P_{B1}=P_{B1a}$). This processing is intended to prevent revving of the engine due to difference among individual transmission units or dispersion in activation in clutch C-1 caused by aging. This constant pressure maintaining time is monitored in the next step S23, and is continued until the judgment becomes Yes (timer t>t_wait). After an elapse of this timer set time, brake B-1 disengagement start processing is performed for rapidly lowering the servo hydraulic pressure to a predetermined pressure in step S24 ($P_{bs}=P_{b1c}$) Then, processing is performed for gradually lowering the servo hydraulic pressure in step S25 (sweep-down at a gradient of $dP_{B1C}$), and the degree of advancement of shift (Shift B) is further judged in the next step S26. In this case also, the degree of advancement is judged No at the initial stage, and thus, a loop for returning to step S25 is repeated.

Thus, when the degree of advancement is judged Yes in step S26 (Shift R>S_End 2), low-pressure processing is performed for completely removing the servo hydraulic pressure of brake B-1 in the next step S27 (sweep-down at a gradient of $dP_{B1d}$). This processing itself is completed by solenoid valve 3 reaching a full output, and thus, 6–4 shift control for brake B-1 disengagement ends without performing monitoring judgment in particular.

Figure 8A:
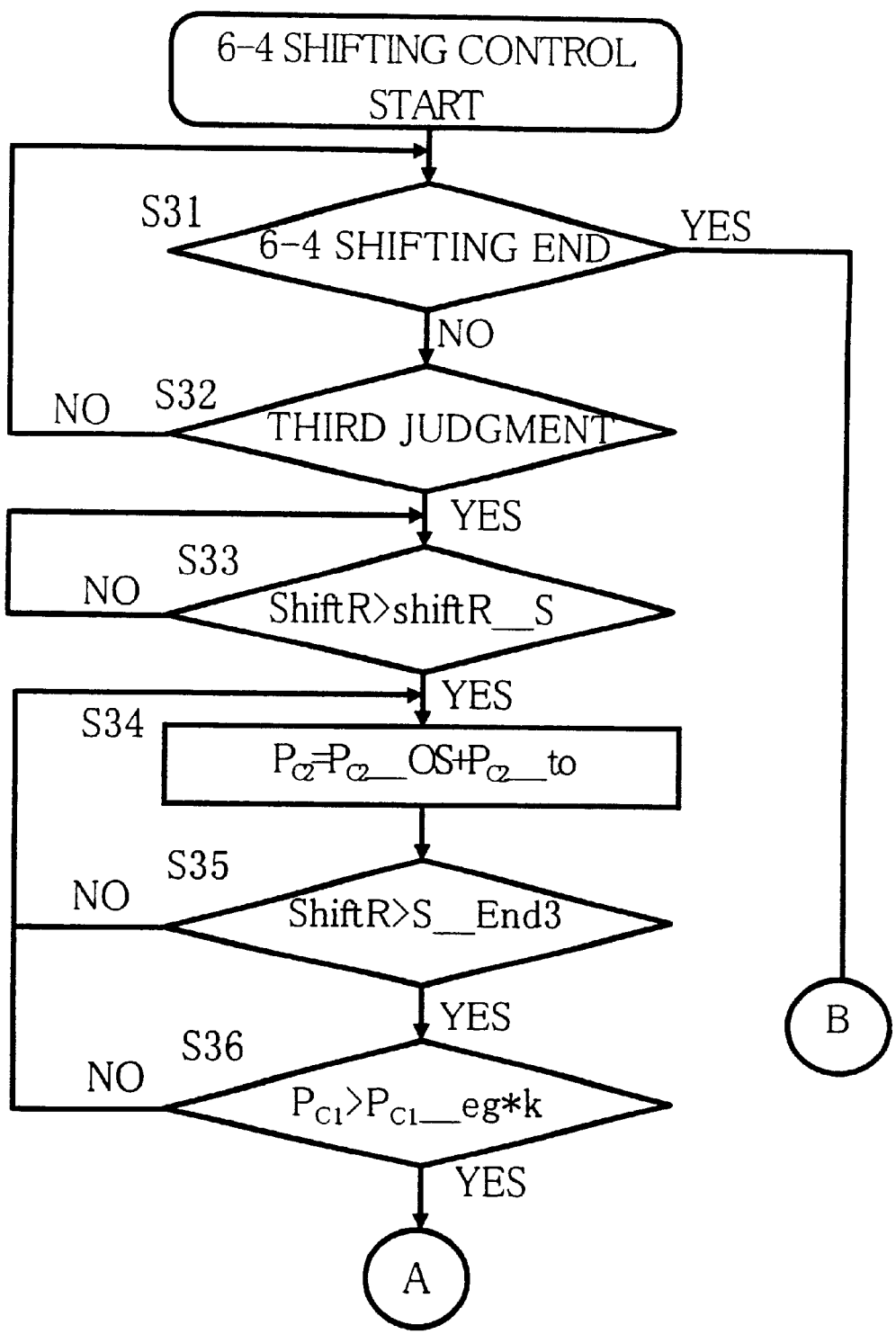
FIGS. 8(a) and 8(b) are a flowchart showing C-2 clutch disengagement control during 6→3 shifting.
Figure 8B:
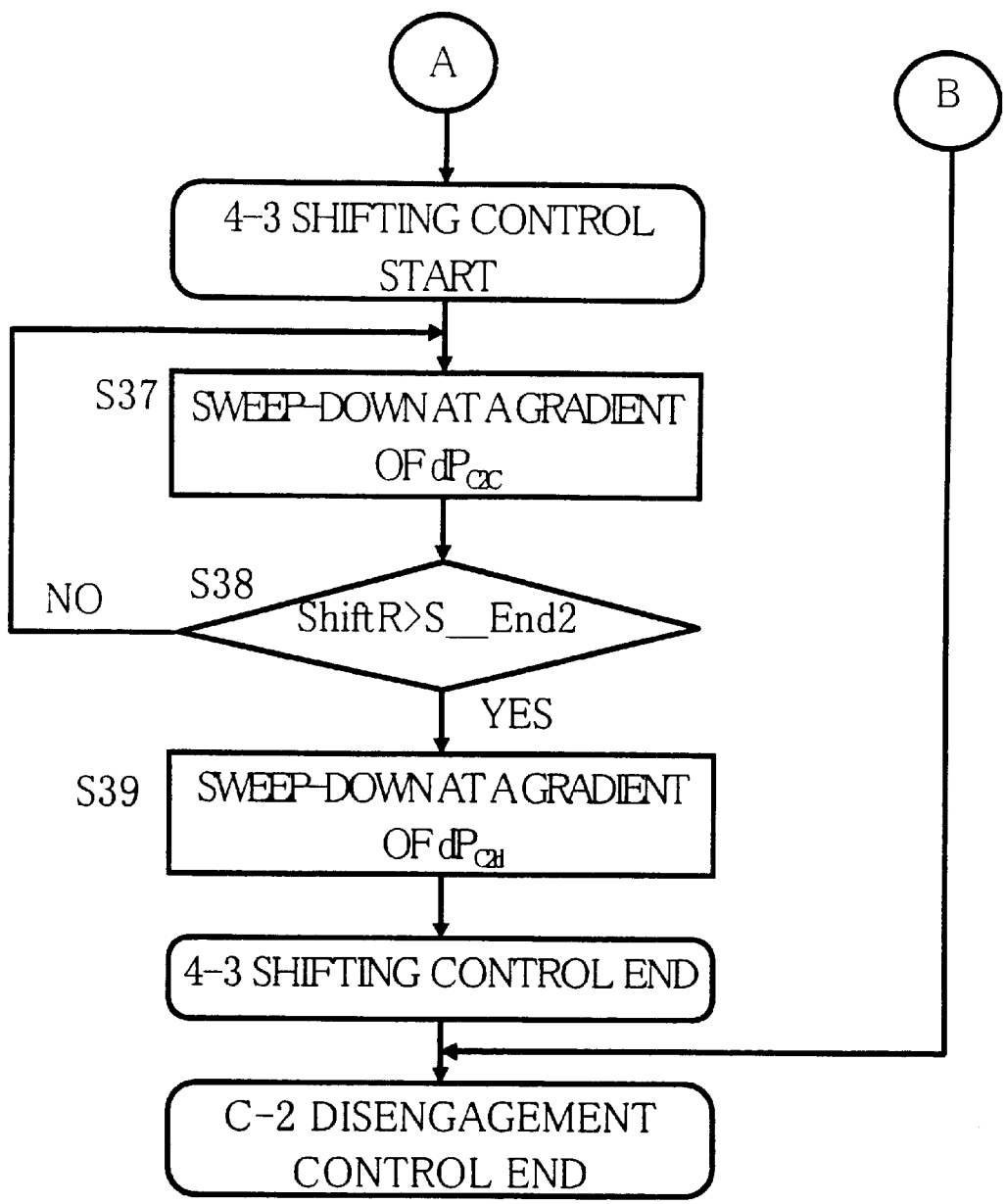

Next, a control flow of releasing clutch C-2 as a second engagement element is shown in FIGS. 8(a) and 8(b).

[C-2 Disengagement Control]

In this processing, it is assumed that C-2 disengagement control does not work when 6–4 shifting has already ended. In order to exclude this case, initially, end of 6–4 shifting is judged in step S31. When it is judged Yes, the subsequent processing is skipped, and C-2 disengagement control ends. Under this exclusion, in the next step S32, it is judged whether or not a shifting instruction to a third speed is established (3rd judgment). In this manner, the above shifting is discriminated from shifting to another speed. Thus, after it is verified that this control is executed properly, judgment of the shift advancing state (Shift R) is started for determining a start timing of lowering the servo hydraulic pressure of clutch C-2 in step S33. In this case, an indicator for judgment of the shift advancing state is set to the value (Shift R_S) based on a revolution of the shift input shaft. When the judgment becomes Yes (Shift R>Shift R_S), low-pressure processing ($P_{c2}=P_{c2}$_OS+$P_{c2}$_to) is performed for rapidly lowering the servo hydraulic pressure of clutch C-2 in step S34. In this case, a predetermined hydraulic pressure includes a hydraulic pressure ($P_{c2}$_OS) corresponding to the safety factor in the hydraulic pressure ($P_{c2}$_to) corresponding to an input torque to clutch C-2.

Figure 9:
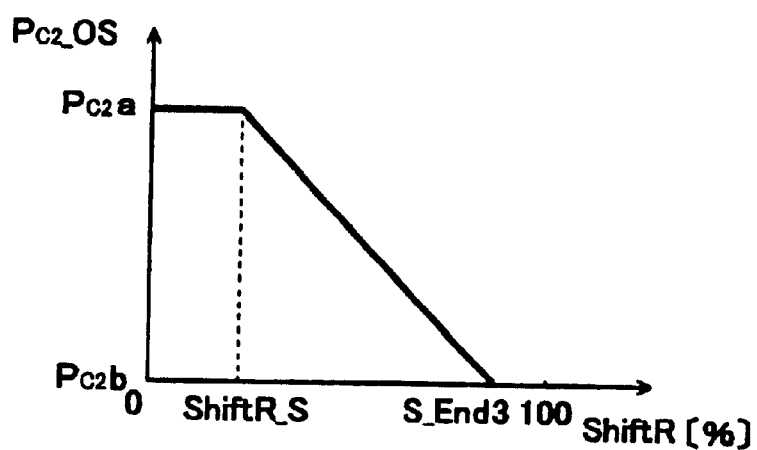
FIG. 9 is a hydraulic characteristic chart showing a method for setting a safety factor of the hydraulic pressure of C-2 clutch disengagement.

Here, the input torque can be obtained by calculating an engine torque from a map indicating the degree of opening of throttle and the engine revolution; calculating a speed ratio from the input and output rotation frequencies of a torque converter; and multiplying the resultant engine torque by the speed ratio. The input torque is converted into a hydraulic pressure by dividing it by a multiple of the piston receiving pressure area, the number of friction members, effective radius, and frictional coefficient of the hydraulic servo for an engagement element, and adding the piston stroke pressure to that value. However, in this case, as shown in FIG. 9, the hydraulic pressure corresponding to the safety factor ($P_{c2}$_OS) is decreased from $P_{c2a}$ to $P_{c2b}$ in accordance with the advancement of shift. In this case, disengagement (slip) of clutch C-2 is started by setting $P_{c2b}$ to 0. It is an aspect of the invention to set this time point to a point before 100% of shift advancement. This point will be described in detail relative to an engagement (slip) start timing of clutch C-1. Thus, while low-pressure processing is performed, judgment of shift advancement state (Shift R) is made for judging a stage preceding fourth speed synchronization in the next step S35 (Shift R>S_End 3). When this judgment before synchronization becomes Yes, it is judged whether or not the servo hydraulic pressure ($P_{c1}$) of clutch C-1 exceeds a hydraulic pressure ($P_{c1}$_eg*k) that is lower than a hydraulic pressure required for maintaining the engagement of an input torque ($P_{c1}>P_{c1}$_eg*k). In this case, k is a coefficient, which may be set to, for example, about 0.7. An input torque in this judgment is calculated as described above. Establishment of the judgment represents that the fourth speed is completely achieved. Thus, 4–3 shifting control is substantially entered (start of 4–3 shifting control).

In step S37 as the initial step for 4–3 shifting control, while the servo pressure ($P_{c2}$) of clutch C-2 is subjected to sweep-down processing at a gradient of $dP_{c2c}$, judgment of shift advancement state (Shift R) is performed in step S38 (Shift R>S_End 2). Then, sweep-down is continued until the judgment becomes Yes. When the judgment is Yes, low-pressure processing is performed in step S39 to completely remove the servo hydraulic pressure of clutch C-2 (sweep-down at a gradient of $P_{c2d}$). This processing itself is completed by the solenoid valve 2 reaching full output, and 4–3 shifting control ends for C-2 clutch disengagement without performing monitoring judgment in particular. Thus, C-2 disengagement control ends.

Figure 10:
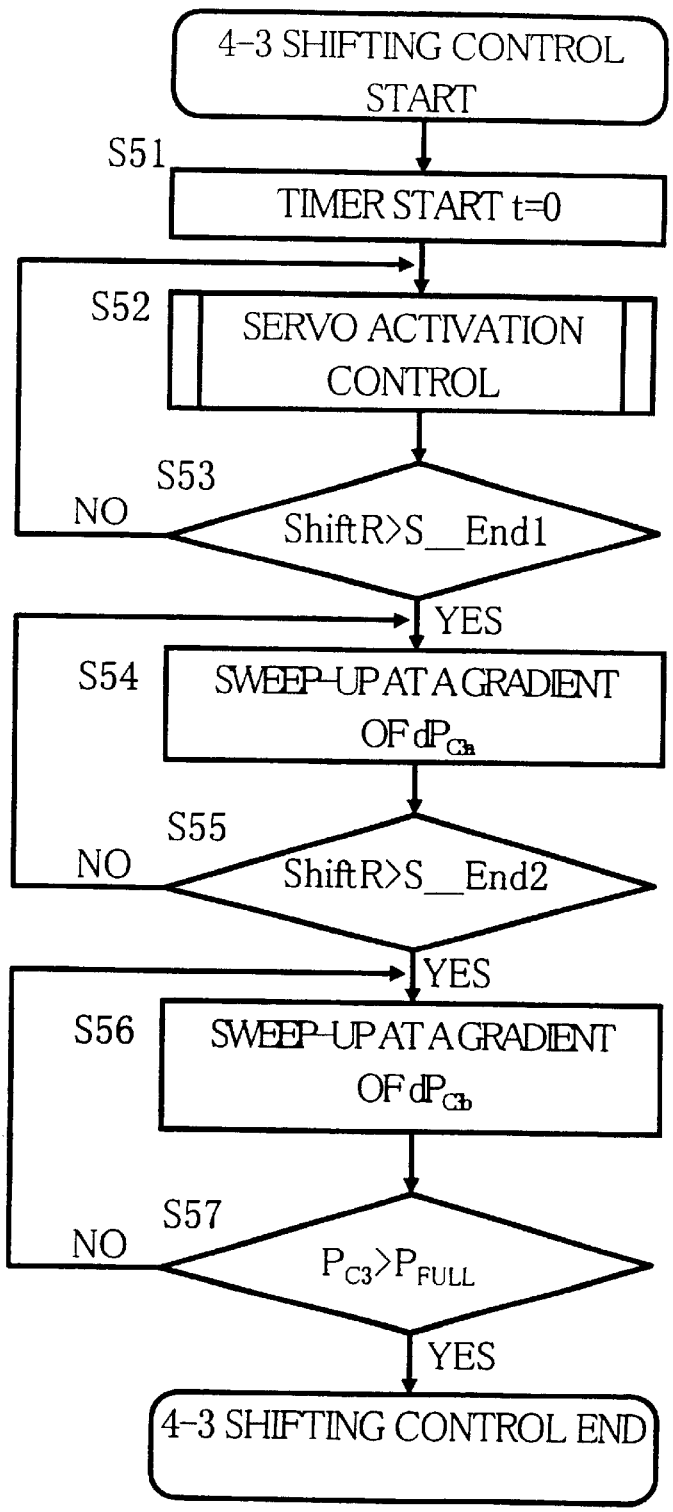
FIG. 10 is a flowchart showing C-3 clutch engagement control during 6→3 shifting.

Next, a control flow of engaging clutch C-3 as a fourth engagement element is shown in FIG. 10.

[C-3 Engagement Control]

This control is substantially the same as the engagement control of clutch C-1 except different start timing. In this control, a timer is started in step S51 as the initial step (timer start t=0). Then, servo activation control subroutine processing is performed in step S52. This processing is intended for maintaining the subsequent piston stroke pressure for reducing a space between the first fill of the hydraulic pressure for filling the inside of the hydraulic servo cylinder of clutch C-3 and the hydraulic servo piston and the friction member of an engagement element, and is well known to be generally performed for clutch engagement. Next, an advancing state (Shift R) is judged as an index for judging advancement of shift in step S53 (Shift R>S_End 1). This shift advancing state (Shift R) is described as above. When this judgment result is Yes, pressure increase for engaging clutch C-3 is started in step S54 (sweep-up at a gradient of $dP_{c3a}$). Then, while this pressure increase is continued, it is judged whether or not the shift advancing state (Shift R) reaches a third gear synchronization (Shift R>S_End 2) in the next step S55. This judgment becomes No at the initial stage, the sweep-up is continued by repeating the loop for returning step 54 until shift advances, i.e., the judgment result becomes Yes. When the judgment in step S55 is Yes, processing for increasing a pressure to a line pressure is performed to reliably maintain engagement of clutch C-3 (sweep-up at a gradient of $dP_{c3b}$) in step S56. During this period, it is repeatedly judged whether or not the servo hydraulic pressure reaches the line pressure ($P_3>P_{FULL}$) in the next step S57. Thus, when the judgment in step S57 becomes Yes, 4–3 shifting control ends for controlling engagement of clutch C-3.

Figure 11:
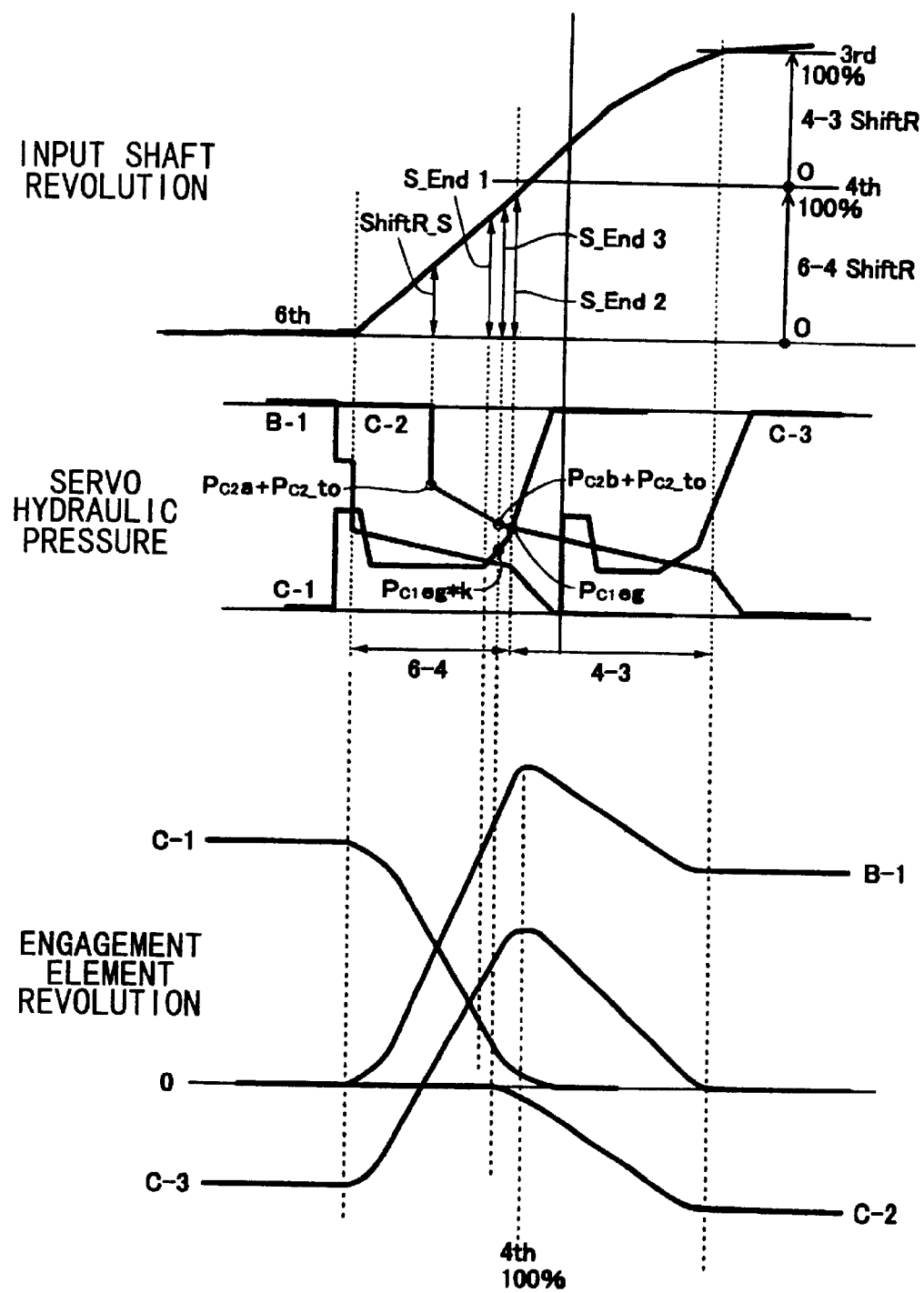
FIG. 11 is a timing chart showing the control relationship of each engagement element during 6→3 shifting.

FIG. 11 is a timing chart showing a relationship between the servo hydraulic pressure and the input shaft revolution with respect to activation of four engagement elements by the 6→3 shift control. In the drawing, in the case of braking, it is assumed that the engagement element revolution is positive when the rotation side element rotates in the same direction as engine rotation, and is negative when it rotates in the reverse direction. For a clutch, a side in which the output element side causes acceleration rotation in the engine rotation direction with respect to clutch input rotation is defined to be positive, and the reverse side is defined to be negative.

As shown in FIG. 11, engagement control of clutch C-1 and disengagement control of brake B-1 are started simultaneously. When the servo hydraulic pressure of brake B-1 is increased to a first fill pressure, the servo hydraulic pressure of brake B-1 is temporarily set to a pressure that is slightly lower than a line pressure at the same time. Then, the pressure is further lowered to a predetermined pressure. In this manner, 6–4 shifting is started, and the input shaft revolution starts to increase. The servo hydraulic pressure of brake B-1 is lowered at a constant gradient; the servo hydraulic pressure of clutch C-1 is maintained to a piston stroke pressure, and clutch C-1 enters an engagement standby state. At this time, as is evident by referring to FIG. 4, brake B-1 starts slipping, whereby small-diameter sun gear S3 is oriented in deceleration direction, and large-diameter sun gear S2 is oriented in acceleration direction around an engagement point of clutch C-2 being engaged. In this manner, a rotation element side of brake B-1 starts rotating in the positive direction from a state where engagement equals 0; and an output element side of clutch C-3 is accelerated from negative rotation on the output element with respect to deceleration rotation on the input element side, and rotates in the positive direction. On the other hand, clutch C-1 is decelerated in a direction identical to the engine rotation at the same speed from a state of positive rotation significantly accelerated with respect to the engine rotation.

Then, when a servo hydraulic lowering start timing is obtained from an increase in input shaft revolution, the servo hydraulic pressure of clutch C-2 is rapidly lowered to a hydraulic pressure to the extent such that disengagement start (slip) is not obtained, from which the pressure is reduced at a predetermined gradient. On the other hand, 6–4 shifting to the fourth shift stage synchronization is advanced. When judgment (S_End 1) of 70% becomes Yes before fourth speed synchronization from the input shaft revolution, the servo hydraulic pressure of clutch C-1 is increased, and engagement of clutch C-1 (slip) is advanced. In this manner, when clutch C-1 becomes 90% before completion of engagement, judgment before fourth gear stage synchronization (S_End 2) becomes Yes. Thus, the servo hydraulic pressure of clutch C-1 is switched such that the pressure is increased to the line pressure. On the other hand, the servo hydraulic pressure of clutch C-2 during pressure fall control is controlled so as to be a hydraulic pressure suitable to reach the point preceding to the disengagement start by its reduction control when the judgment of a state preceding fourth gear stage synchronization is Yes (S_End 3), and thus, a second stage control state in which a gradient is changed from this stage is obtained. At this time, clutch C-2 slips, and negative rotation occurs. Immediately after this occurrence, clutch C-1 decelerating in a state where a slip is decelerated from a disengagement deceleration state turns to 0 rotation of engagement. On the other hand, rotation of clutch C-3 is continuously increased. When it is judged that the servo hydraulic pressure of clutch C-1 reaches a line pressure, engagement control of clutch C-3 is started. In this manner, rotation of clutch C-3 decreases with rotation during fourth gear synchronization (100% of 4th) being a peak, and is oriented in a direction of revolution 0 of complete engagement via a slip deceleration state. Hydraulic pressure control according to advancement of engagement of clutch C-3 is similar to a case of clutch C-1 except that judgment of 70% advancement and a state preceding to the synchronization is substituted by a third speed. When third speed synchronization is obtained by advancement of 4–3 shifting, the servo hydraulic pressure of clutch C-2 is completely disengaged, and the servo hydraulic pressure of clutch C-3 is increased to the line pressure. In this manner, 6→3 shifting is achieved in the form of 6–4–3 shifting.

Figure 12:
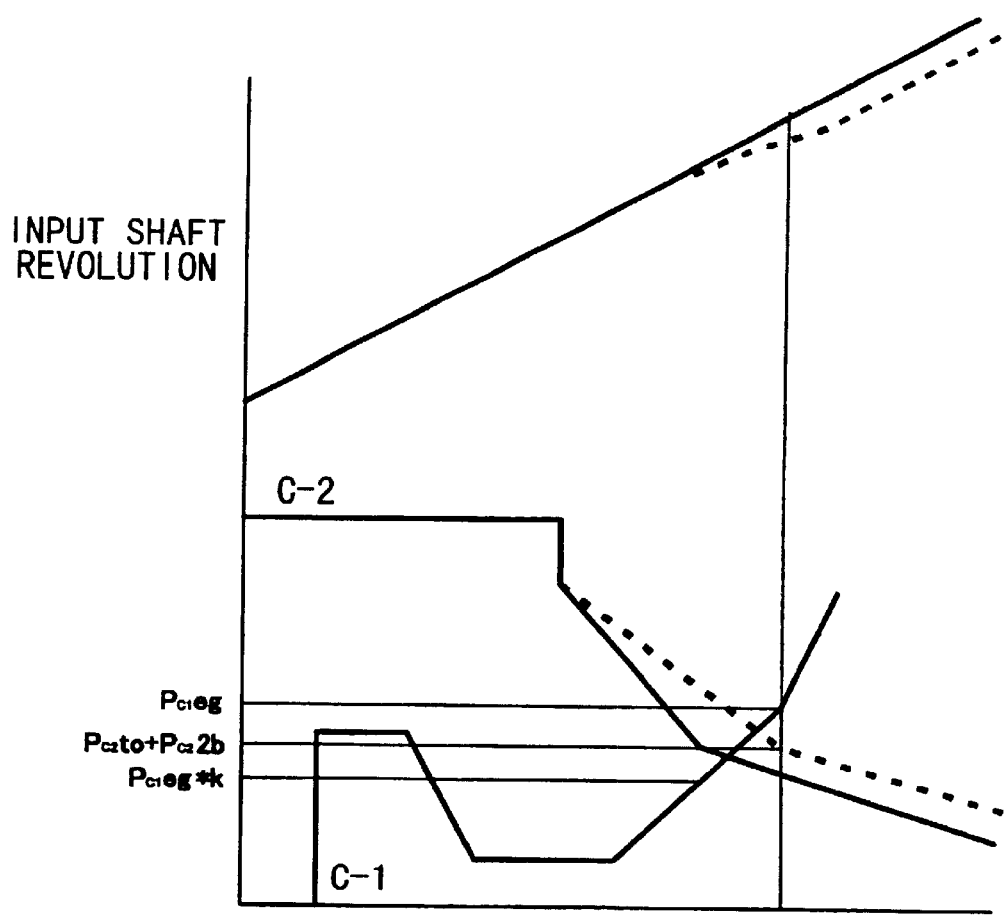
FIG. 12 is a timing chart showing the control relationship of each engagement element during 6–4 and 4–3 shifting.

Influence of behavior of clutch C-2 on disengagement side and clutch C-1 on engagement side upon a change in input shaft revolution will be described in more detail with reference to FIG. 12. As shown in the drawing, if the pressure of the hydraulic servo of clutch C-2 indicated by a dotted line is reduced with respect to a pressure increase indicated by a solid line of the hydraulic servo of clutch C-1, engagement of clutch C-1 is completed before it starts slipping. Thus, the input shaft revolution causes slow-down as indicated by the dotted line due to torque dragging, which causes a driver to experience shift shock. Such slow-down of the input shaft revolution inevitably occurs even if the engagement completion point ($P_{c1}eg$) of clutch C-1 and disengagement start point ($P_{c2}to+P_{c2}2b$) of clutch C-2 could theoretically coincide with each other. In contrast, due to a low pressure of the hydraulic servo of clutch C-2 indicated by the solid line according to the invention, engagement completion (complete engagement) of clutch C-1 occurs immediately after the slip of clutch C-2. In this slip state immediately after disengagement start of clutch C-2 and in the slip state just before completion of engagement of clutch C-1, a continuous increase state of the input shaft revolution can be obtained, in which the above slow-down is offset by an appropriate amount of engine revving.

Figure 13:
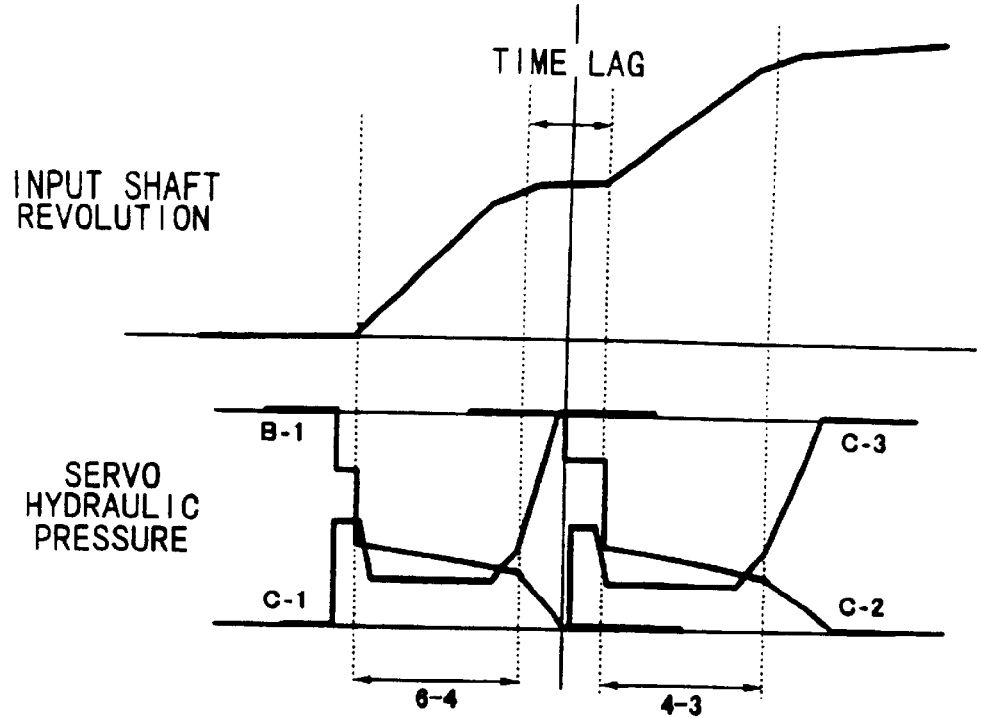
FIG. 13 is a timing chart showing a relationship between the engagement-disengagement and advancement of shifting of two clutches during 6→3 shifting conventionally performed.

Further, FIG. 13 is a timing chart showing a conventional two-staged shifting of 6–4 and 4–3 in comparison with the above 6–4–3 shifting. In the timing chart shown in FIG. 13, a substantial shifting period is the period indicated by the bi-directional arrows 6–4 and 4–3 . During these shifting periods, a period indicated as a time lag in the drawing occurs when shifting is not performed substantially continuously. In contrast, in the time chart shown in FIG. 11, a period indicated by the bi-directional arrows 6–4 and 4–3 becomes continuous, making it possible to reduce the shifting period corresponding to the above time lag.

Thus, according to the shifting control apparatus of the invention, disengagement of clutch C-2 is started after disengagement start of brake B-1, and engagement of clutch C-1 is completed. Then, engagement of clutch C-3 is completed, thereby maintaining engagement until disengagement start of one engagement element, i.e., clutch C-2 through a shifting period and maintaining engagement from completion of engagement of clutch C-1. In this manner, a shifting period in which engagement is maintained is expanded, and a period in which all of the four engagement elements is slipping is minimized. Moreover, before completing engagement of clutch C-1, disengagement of clutch C-2 is started, thereby obtaining a shift state where two elements are not completely engaged simultaneously during the shift. Thus, continuous shifting free from two-stage shifting can be performed while shifting is advanced in ideal state.

In addition, after engagement start of clutch C-1 and before performing complete engagement, disengagement of clutch C-2 is started, and slow-down of shifting caused with the engagement start of clutch C-1 is offset by revving of the engine caused by slipping of the second engagement element, thus enabling entirely smooth continuous shifting.

Moreover, the hydraulic pressure for clutch C-2 is lowered by a predetermined quantity as a state of shifting to the third shifting position (fourth speed) is advanced. The slower the shifting state becomes, the higher the hydraulic pressure of clutch C-2 is increased. Thus, engine revving or the like in the middle of shifting to the third shifting position (fourth speed) can be prevented. As the shifting position is advanced, the hydraulic pressure for clutch C-2 is lowered, thus making it possible to start shifting to the second shifting position (third speed) with no time lag.

In addition, when a standby hydraulic pressure for clutch C-2 is set, clutch C-2 can be theoretically maintained without slipping by setting the standby hydraulic pressure to a hydraulic pressure according to an input torque to be inputted to the transmission. Actually, it is well known to set a margin of a certain safety factor in consideration of dispersion or the like in the hardware system. If the safety factor is excessively large, shifting start from the third shifting position (fourth speed) to the second shifting position (third speed) will be delayed. In contrast, if the safety factor is excessively small, in the case where dispersion in hardware system is greater than the safety factor, clutch C-2 slips, and engine revving occurs. Therefore, the above safety factor is sequentially reduced from the maximum value according to the degree of advancement of shifting from the first shifting position (sixth speed) to the third shifting position (fourth speed), thereby making it possible to prevent the delay of the start of shifting to the second shifting position (third speed), and reliably prevent an occurrence of engine revving at the end of shift to the third shifting position (fourth speed).

In particular, in the invention, control of the servo hydraulic pressure of brake B-1 is lowered to a hydraulic pressure according to an input torque at the same time as shifting start, so that brake B-1 slips, and thus, the input revolution increases immediately. Therefore, this activation is not only helpful to reduce the actual shifting time, but also causes quick shift feeling. In particular, the above activation effectively works in order to improve the response in kick-down shifting and driving comfort, and serves as a skip shifting to respond to the driver's request quickly.

Figure 14:
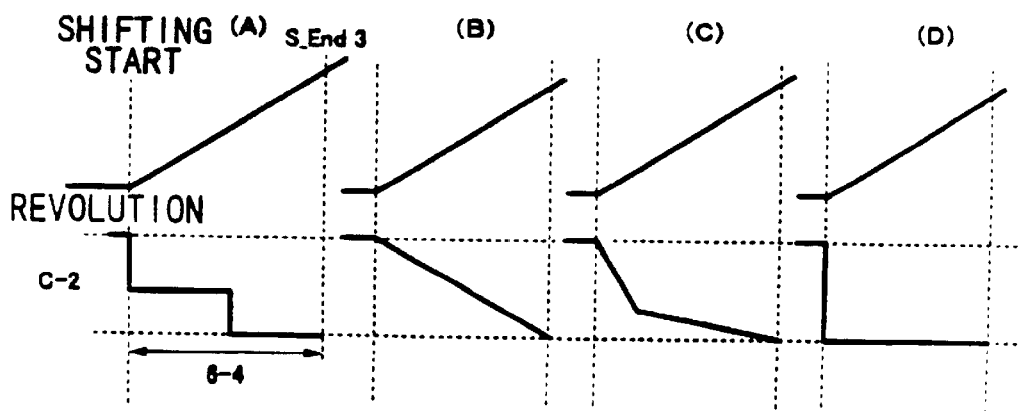
FIGS. 14(a)–14(d) are timing charts showing various modified examples of the hydraulic characteristics of C-2 clutch disengagement during 6→3 shifting according to the invention.

In the meantime, in the invention, the servo hydraulic pressure of clutch C-2 is continuously swept down to the shift state (S_End 3) before fourth speed synchronization at a predetermined gradient in the middle of shifting to the fourth gear stage. These hydraulic pressure lowering characteristics can also displace the other characteristics. FIGS. 14(A)–14(D) show a modified example of the characteristics, in which the servo hydraulic pressure of clutch C-2 is swept down from the start of shifting to the fourth speed (rotation change start). FIG. 14(A) shows a characteristic example when hydraulic pressure is lowered stepwise and maintained; FIG. 14(B) shows an example when hydraulic pressure is lowered at a predetermined gradient; and FIG. 14(C) shows an example when a lowering gradient is changed; and FIG. 14(D) shows an example when hydraulic pressure is lowered to a predetermined pressure, and maintained there. In addition, a start timing of lowering the hydraulic pressure may be obtained when issuing a shift instruction. Thus, the lowering characteristics of hydraulic pressure can adopt various characteristics.

Figure 15:
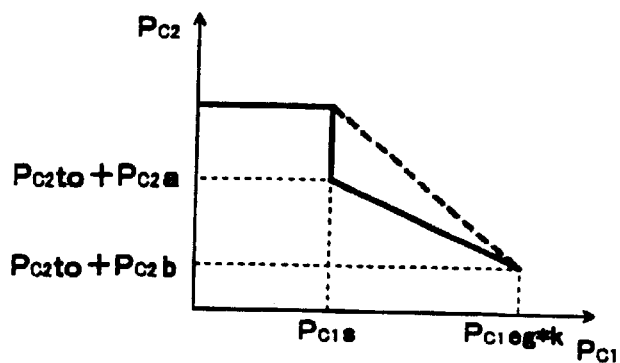
FIG. 15 is a hydraulic characteristic view of hydraulic control of the servo during 6→3 shifting using the control apparatus according to the invention.

Similarly, various forms can be employed for a start timing of lowering the hydraulic pressure. FIG. 15 shows a construction of the invention in which the start timing of lowering the hydraulic pressure is changed. In the invention, lowering of the hydraulic pressure ($P_{c2}$) of clutch C-2 to be disengaged during 4–3 shifting is started when the hydraulic pressure ($P_{c1}$) of clutch C-1 to be engaged at 6–4 shifting exceeds a predetermined value ($P_{c1}$s). In this case, the initial hydraulic pressure ($P_{c2}$) of the low pressure is set to $P_{c2}$to+ $P_{c2}$a. The characteristics indicated by the dashed line of the drawing shows the hydraulic pressure characteristics when a safety factor is not considered.

According to lowering control of the hydraulic pressure ($P_{c2}$) of clutch C-2 of the second embodiment, the start timing of lowering the hydraulic pressure can be controlled by judgment based on an increase in the servo hydraulic pressure of clutch C-1 to be specifically engaged. There can be provided an advantage that it is unnecessary to provide an additional sensor for detecting a torque, thus making it possible to ensure cost reduction.

Figure 16:
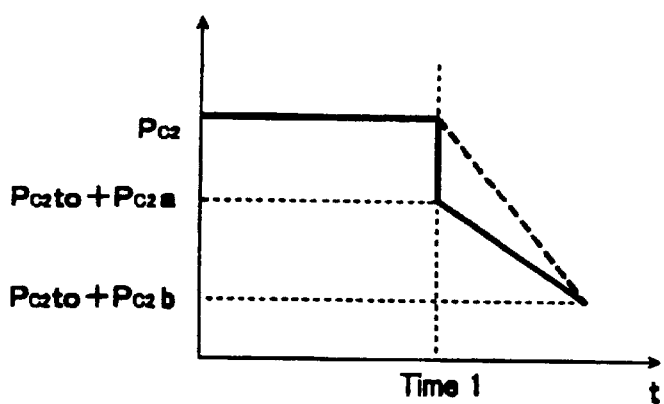
FIG. 16 is a timing chart showing hydraulic control of the servo during 6→3 shifting using the control apparatus according to the invention.

Next, FIG. 16 shows a construction of the invention in which lowering of the hydraulic pressure ($P_{c2}$) of clutch C-2 to be disengaged at 4–3 shifting is timer-controlled. In the invention, shift advancement is estimated by counting using a timer (t) started at the start of 6–4 shifting, and lowering of the hydraulic pressure is started in comparison with a predetermined time (Time 1) set in advance in accordance with a timing before synchronization of the fourth speed. This predetermined time (Time 1) may be stored in a memory of the shift apparatus in the form of a map. In the invention also, the characteristics indicated by the dashed line of the drawing show the hydraulic pressure characteristics when the safety factor is not considered.

In the case of this control method, lowering of the hydraulic pressure for clutch C-2 is started after an elapse of the predetermined time (Time 1) from the start of shifting to the third shifting position (fourth speed). In this manner, lowering of the hydraulic pressure of clutch C-2 can be started prior to shifting to the second shifting position (third speed) with an extremely simple construction. Thus, installation of a sensor for judging shift advancement can be eliminated, and further, an increase in the memory capacity of the control unit (ECU) for program processing is not necessary.

Figure 17:
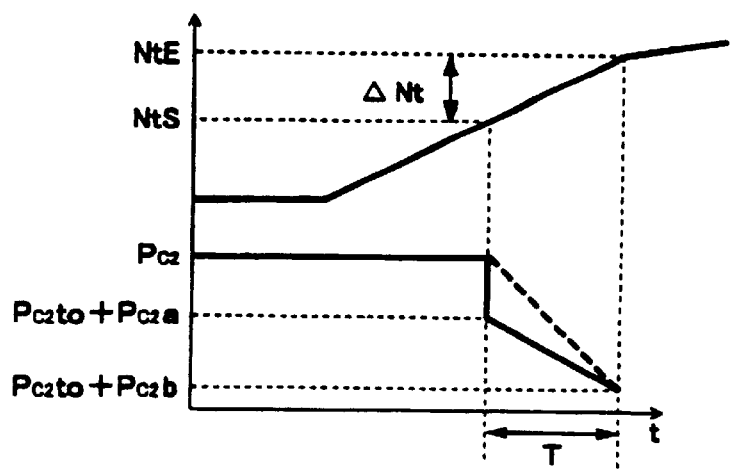
FIG.17 is a timing chart showing hydraulic control of the servo during 6→3 shifting using the control apparatus according to the invention.

Next, FIG. 17 shows a construction of the invention in which lowering of the hydraulic pressure ($P_{c2}$) to be disengaged at 4–3 shifting is controlled based on the input/output shaft revolution of the transmission. In the fourth embodiment, a time (T) elapsing until clutch C-2 starts slipping is set in advance through experiment or the like. Then a change of the input shaft rotation within the time (T) is obtained by detecting an acceleration of the input rotation ($\Delta Nt$) during 6–4 shifting, thereby obtaining the number of changes that occurred in the revolution. Next, the output shaft revolution of the transmission when 6–4 shifting is started is multiplied by a gear ratio after shifting (fourth speed), whereby the input shaft revolution of the shifting is predicted at the end of 6–4 shifting. A rotation change quantity produced until clutch C-2 starts slipping is subtracted from the predicted input shaft revolution, whereby calculating the shift input shaft revolution (NtS) for starting lowering of the hydraulic pressure of clutch C-2. Namely, this relationship is represented by the following formula:

$$Nt > \text{fourth gear ratio after shift} \times \text{output shaft revolution} - \Delta Nt \times T$$

In the invention also, the characteristics indicated by the dashed line in the figure shows the hydraulic pressure characteristics when the safety factor is not considered.

In this manner, a time (T) elapsing until clutch C-2 starts slipping is set, and a revolution (NtS) for starting lowering of the hydraulic pressure for clutch C-2 from the time (T) is calculated by revolution acceleration ($\Delta Nt$). Thus, shifting to the second shifting position (third speed) can be started with no time lag, and engine revving due to slipping of clutch C-2 can be prevented at the end of shifting to the third shifting position (fourth speed).

Figure 18:
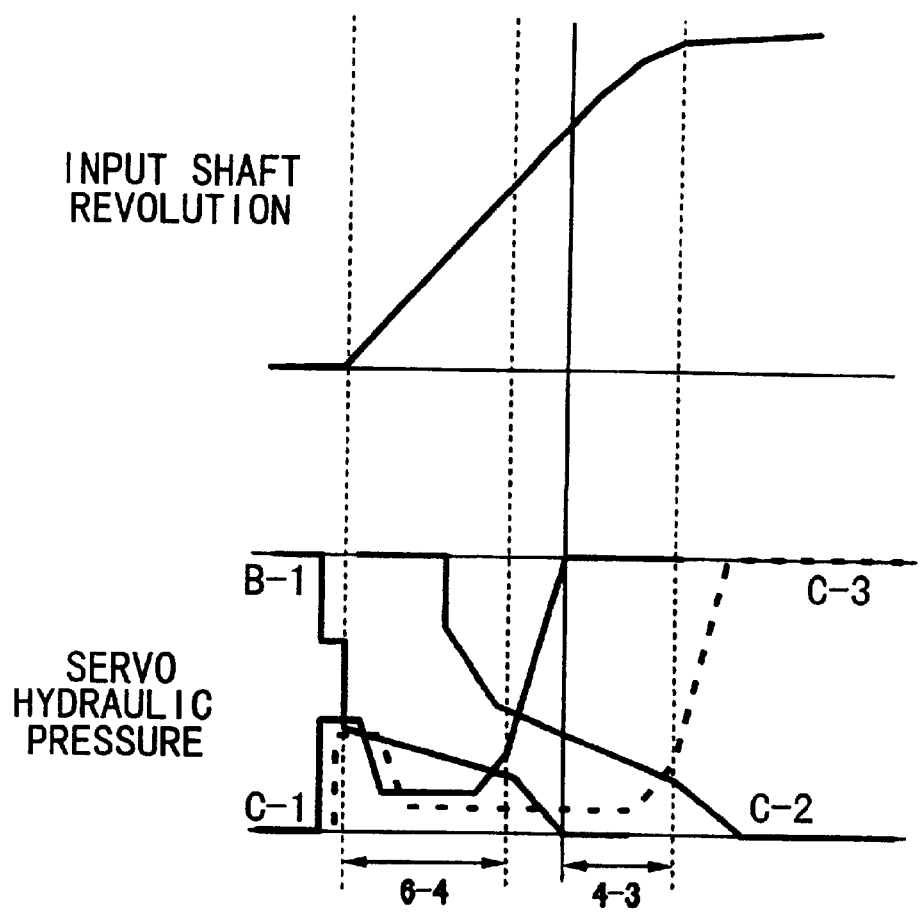
FIG. 18 is a timing chart showing hydraulic control of the servo during 6→3 shifting using the control apparatus according to the invention.

In the invention, hydraulic pressure control for disengagement of clutch C-2 is variously changed in response to disengagement start of brake B-1. Another aspect of the invention can be adopted for a timing of the hydraulic pressure supply of clutch C-3. FIG. 18 is a timing chart showing how the above control is changed. In the invention, there is employed a method in which hydraulic pressure supply of clutch C-3 is started at the same time as 6–4 shifting start, the hydraulic servo piston reduces an invalid stroke, and the low pressure (piston stroke pressure) is ready for a hydraulic pressure in which a friction member enters a state just before engagement.

Although a case of 6→3 shifting has been described above, shift mode is similar in the case of 5→2 shifting expect that engagement elements targeted for control are substituted. In this case, the first engagement element is clutch C-2; the second engagement element is clutch C-3; and the third engagement element is clutch C-1. However, as specific properties of this gear train, there is adopted a construction in which engagement (lock) of a one-way clutch F-1 is employed as a first engagement element in place of engagement of brake B-1 for achieving the second shifting position. Unlike a case of 6→3 shifting, hydraulic pressure control for engagement of brake B-1 at a second shifting position (3–2 shifting) is eliminated, thus simplifying the control.

Figure 19:
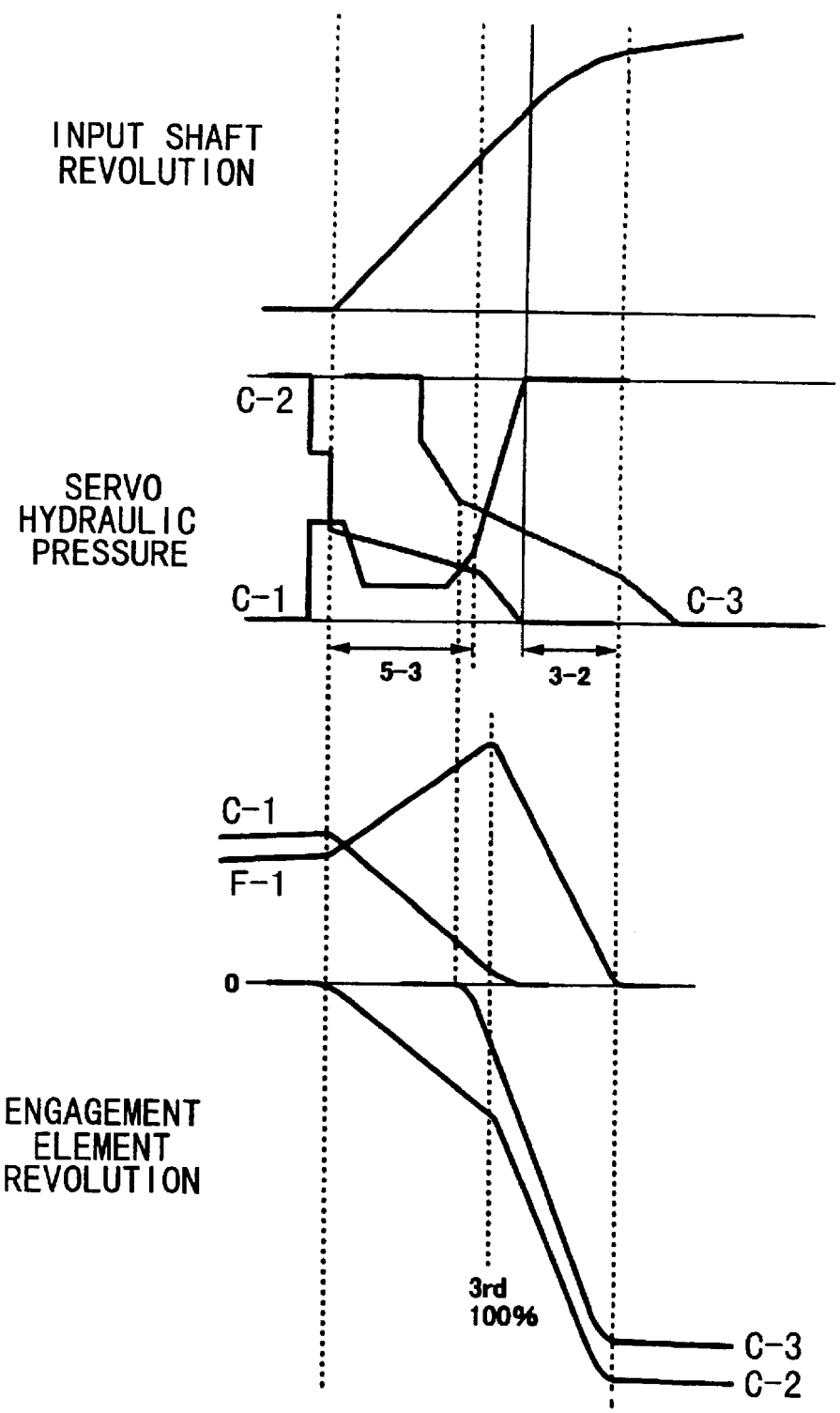
FIG. 19 is a timing chart showing a control relationship of each engagement element during 5→2 shifting using the control apparatus according to the invention.

FIG. 19 is a timing chart showing 5→2 (5–3–2) shifting. In this case, clutch C-2 is disengaged and controlled in a similar control method in place of brake B-1 in the first embodiment, and clutch C-3 is disengaged and controlled in the similar method in place of clutch C-2. As stated above, engagement of brake B-1 to be substituted for clutch C-3 is switched to automatic engagement of the one-way clutch F-1, thus making it non-controllable. In this case, the rotation of each engagement element is substituted by a description through inquiry between a graph of the engagement element revolution depicted by a method similar to the timing chart shown in FIG. 11 and a speed graph of FIG. 4. In the case of this 5→2 shifting, in shifting from the third shifting position (third speed) to the second shifting position (second speed), shifting can be performed merely by manipulating clutch C-3 as a second engagement element on the disengagement side, thus making it possible to achieve simplified control. Moreover, as is evident from a change in revolution of the one-way clutch F-1 shown in the drawing, the one-way clutch F-1 is automatically locked at the same time as complete disengagement of clutch C-2, thus ending shifting, and making it possible to shorten the shifting period.

Finally, in FIG. 20, although it does not apply to the exemplified gear train, there is shown a timing chart showing shifting in the case of gear train in which the one-way clutch (OWC) engagement is employed in place of brake engagement at the third shifting position in reverse to the above engagement relationship. In such a case, as illustrated, synchronization with the third shifting position in the first shifting position can be judged by locking of the one-way clutch constituting the third engagement element. Moreover, hydraulic pressure control for engagement is directed to control of the servo pressure that is only an engagement element during the second shift stage, thus making control simpler.

Although the invention has been described above in detail by way of a specific gear train, the scope of the invention is not limited to the exemplified gear train. The invention is applicable to all gear trains in which a relationship in engagement and disengagement of engagement elements in shifting to which four engagement elements are associated with each other is directed to simultaneous grip change of two elements.

Although the invention has been described by way of 6→3 and 5→2 shift-down operations, the invention is also applicable to 3→6 and 2→5 shift-up operations.

What is claimed is:

1. A shift control apparatus for an automatic transmission in which activation of four engagement elements is required for shifting from a first shifting position to a second shifting position, the first shifting position being achieved by engagement of first and second engagement elements, and the second shifting position being achieved by engagement of third and fourth engagement elements, said control apparatus comprising shift control means wherein:

disengagement of the second engagement element is started after the start of disengagement of the first engagement element;

engagement of the fourth engagement element is completed after completing engagement of the third engagement element; and disengagement of the second engagement element is started before completing engagement of e third engagement element.

2. The shift control apparatus for an automatic transmission according to claim 1, wherein said shift control means starts disengagement of the second engagement element just before completing engagement of the third engagement element.

3. The shift control apparatus for an automatic transmission according to claim 1, wherein said second and third engagement elements are controlled by hydraulic pressures of respective hydraulic servos, and said shift control means starts disengaging the second engagement element by lowering the hydraulic pressure of the hydraulic servo of the second engagement element after the start of engaging the third engagement element by increasing the hydraulic pressure of the hydraulic servo of the third engagement element, and further completes engaging the third engagement element by increasing the hydraulic pressure of the hydraulic servo of the third engagement element.

4. The shift control apparatus for an automatic transmission as claimed in claim 3, wherein said shift control means detects an advancing state of shifting from the first shifting position to the second shifting position, and controls each hydraulic pressure of the hydraulic servos for the second and third engagement elements in accordance with said advancing state, wherein when the shift advancing state reaches a first reference value, engagement of the third engagement element is started by increasing the hydraulic pressure of the hydraulic servo for the third engagement element, and when the shift advancing state further reaches a second reference value, the third engagement element is engaged completely by further increasing the hydraulic pressure, and when the shift advancing state reaches a third reference value indicating an advancing state between the first and the second reference values, disengagement of the second engagement element is started by decreasing the hydraulic pressure of the hydraulic servo for the second engagement element.

5. The shift control apparatus for an automatic transmission according to claim 3, wherein said shift control means controls a disengaging operation until the second engagement element starts disengaging in accordance with a state of the first engagement element.

6. The shift control apparatus for an automatic transmission as claimed in claim 5, wherein a state of said first engagement element indicates a shifting state that varies depending on the disengaging operation of said first engagement element, said second engagement element being controlled with respect to the disengaging operation until the start of disengagement thereof by decreasing the hydraulic pressure of the hydraulic servo for said second engagement element, and lowering of said hydraulic pressure of the hydraulic servo for said second engagement element is controlled based on a judgment with respect to said shifting state.

7. The shift control apparatus for an automatic transmission according to claim 5, wherein a state of said first engagement element indicates a shifting state that varies depending on the disengaging operation of said first engagement element, said second engagement element being controlled with respect to the disengaging operation of said first engagement element until the start of disengagement thereof by decreasing the hydraulic pressure of the hydraulic servo for said second engagement element, and a timing for the start of lowering said hydraulic pressure of the hydraulic servo for said second engagement element is controlled based on judgment of said shifting state.

8. The shift control apparatus for an automatic transmission according to claim 5, wherein said shifting from the first shifting position to the second shifting position is achieved via a third shifting position, the third shifting position is achieved by engaging one of said four engagement elements and disengaging the other engagement element simultaneously from the first shifting position, and the second shifting position is achieved by activating the remaining two engagement elements from the third shifting position, the state of the first engagement element indicates a shifting state that varies depending on the disengaging operation of the first engagement element, and said shifting state indicates the shifting state from the first shifting position to a third shifting position.

9. The shift control apparatus for an automatic transmission according to claim 3, wherein a shifting state is judged using an index indicating an input/output revolution of the automatic transmission that varies during shifting to a predetermined speed, and lowering of the hydraulic pressure of the hydraulic servo for said second engagement element is started when said index becomes a predetermined value.

10. The shift control apparatus for an automatic transmission according to claim 5, wherein a shifting state is judged using an index indicating an engagement force of the third engagement element to be engaged; and lowering of the hydraulic pressure of the hydraulic servo for said second engagement element to be disengaged is started when engagement of the third engagement element to be engaged is started.

11. The shift control apparatus for an automatic transmission as claimed in claim 10, wherein the engagement force of said third engagement element to be engaged is predicted based on the hydraulic pressure to the hydraulic servo for said third engagement element to be engaged, and lowering of the hydraulic pressure to the hydraulic servo for the second engagement element to be disengaged is started when the hydraulic pressure of the hydraulic servo for the third engagement element to be engaged becomes a predetermined hydraulic pressure or higher.

12. The shift control apparatus for an automatic transmission according to claim 5, wherein the state of the first engagement element indicates a shifting state that varies depending on the disengaging operation of the first engagement element, the shifting state is judged using an index indicating a time taken from shifting start to a predetermined speed, and lowering of the hydraulic pressure to the hydraulic servo for the second engagement element to be disengaged is started at an elapse of a predetermined time from said shifting start.

13. The shift control apparatus for an automatic transmission according to claim 9, wherein said index is set to an input shaft revolution of the transmission, said predetermined value is set to a predicted revolution from a revolution acceleration during shifting based on a time elapsing until the second engagement element to be disengaged starts slipping, and lowering of the hydraulic pressure to the hydraulic servo for the second engagement element to be disengaged is started when said input shaft revolution becomes the predicted revolution.

14. The shift control apparatus for an automatic transmission according to claim 5, wherein lowering of said hydraulic pressure is set such that the hydraulic pressure is lowered by a predetermined quantity along with the advancement of a state of shifting to a predetermined speed.

15. The shift control apparatus for an automatic transmission according to claim 5, wherein the lowering of said hydraulic pressure is set to a value obtained by adding a hydraulic pressure corresponding to a safety factor to a hydraulic pressure corresponding to an input torque, and the hydraulic pressure corresponding to the safety factor is reduced in accordance with a state of shifting from said first shifting position to a third shifting position.

16. The shift control apparatus for an automatic transmission according to claim 1, wherein said shifting from the first shifting position to the second shifting position is performed by a kick-down shifting through depression of an accelerator pedal.

17. The shift control apparatus for an automatic transmission according to claim 1, wherein said shifting from the first shifting position to the second shifting position is achieved via a third shifting position, the third shifting position is achieved by engaging one of said four engagement elements and disengaging the other engagement element simultaneously from the first shifting position, and the second shifting position is achieved by activating the remaining two engagement elements from the third shifting position.

18. The shift control apparatus for an automatic transmission according to claim 17, wherein the third shifting position is set between the first and second shifting positions, and said shifting is performed through a skip shifting.

19. The shift control apparatus for an automatic transmission according to claim 18, wherein:

said third engagement element is engaged during shifting to the third shifting position, said first engagement element is disengaged during shifting to said third shifting position, said fourth engagement element is engaged during shifting to the second shifting position, and said second engagement element is disengaged during shifting to said second shifting position.

20. The shift control apparatus for an automatic transmission according to claim 19, wherein said fourth engagement element is a one-way clutch.

21. The shift control apparatus for an automatic transmission according to claim 1, wherein engagement of said third engagement element is controlled in accordance with an advancing state of shifting that varies depending on the disengagement state of the first engagement element.

22. The shift control apparatus for an automatic transmission according to claim 1, wherein engagement of said fourth engagement element is controlled in accordance with an advancing state of shifting that varies depending on the disengagement state of the second engagement element.

23. The shift control apparatus for an automatic transmission according to claim 1, wherein engagement of said fourth engagement element is controlled in accordance with an advancing state of shifting that varies depending on the engagement state of the third engagement element.

24. The shift control apparatus for an automatic transmission according to claim 23, wherein a control start timing for said fourth engagement element is controlled in accordance with an advancing state of shifting that varies depending on the engagement state of the third engagement, and the control is started after the third engagement element is completely engaged.

25. The shift control apparatus for an automatic transmission according to claim 23, wherein a control start timing of said fourth engagement element is controlled in accordance with an advancing state of shifting that varies depending on the engagement state of the third engagement element, and control of said fourth engagement element is started simultaneously with the start of controlling the third engagement element, and maintained until a timing for starting engagement of said fourth engagement element in accordance with the disengagement state of the second engagement element.

26. The shift control apparatus for an automatic transmission according to claim 1, wherein disengagement starts when engagement elements start slipping.

27. The shift control apparatus for an automatic transmission according to claim 1, wherein complete engagement occurs when the engagement elements no longer slip.

28. A shift control method for shifting an automatic transmission in which activation of four engagement elements is required for shifting from a first shifting position to a second shifting position, the first shifting position is achieved by engagement of first and second engagement elements, and the second shifting position being achieved by engagement of third and fourth engagement elements, said control method comprising:

starting the disengagement of the second engagement element after the start of disengagement of the first engagement element;

completing the engagement of the fourth engagement element after completing the engagement of the third engagement element; and starting the disengagement of the second engagement element before completing the engagement of the third engagement element.

* * * * *